(12) United States Patent
Duan et al.

(10) Patent No.: US 7,059,460 B2
(45) Date of Patent: Jun. 13, 2006

(54) HYDRAULIC COUPLING SYSTEM

(75) Inventors: Xiaohong N. Duan, Canton, MI (US); Loren C. Macklem, Berkley, MI (US); Matt Rahaim, Royal Oak, MI (US); Sohel Anwar, Canton, MI (US); Gary Monkaba, Troy, MI (US); W. Paul Perkins, Dearborn, MI (US); Dean T. Wisniewski, Detroit, MI (US); Todd A. Kendall, Macomb, MI (US); Joseph Palazzolo, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/758,427

(22) Filed: Jan. 14, 2004

(65) Prior Publication Data

US 2004/0159523 A1 Aug. 19, 2004

Related U.S. Application Data

(60) Provisional application No. 60/447,809, filed on Feb. 14, 2003, provisional application No. 60/447,810, filed on Feb. 14, 2003.

(51) Int. Cl.
*F16D 13/72* (2006.01)
(52) U.S. Cl. .................. 192/70.12; 192/85 R
(58) Field of Classification Search ......... 192/70.12, 192/113.34, 113.35; 184/6
See application file for complete search history.

(56) References Cited

U.S. PATENT DOCUMENTS

| 3,007,562 A | 11/1961 | Aschauer |
|---|---|---|
| 3,292,659 A | 12/1966 | Raeber et al. |
| 3,613,848 A | 10/1971 | Reiff |
| 3,760,918 A | 9/1973 | Wetrich et al. |
| 3,912,060 A | 10/1975 | Handke |
| 3,964,506 A | 6/1976 | Grundman |
| 4,094,393 A | 6/1978 | Spokas |
| 4,315,565 A | 2/1982 | Low |
| 4,629,050 A | 12/1986 | Valier |
| 4,828,089 A | 5/1989 | Collins et al. |
| 4,905,812 A | 3/1990 | Shepperd |
| 5,074,394 A | 12/1991 | Motohashi |
| 5,105,922 A * | 4/1992 | Yant ........................ 192/3.58 |

(Continued)

FOREIGN PATENT DOCUMENTS

JP 2002257252 A 9/2002

OTHER PUBLICATIONS

Kiencke, U. and Nielsen, L., "Automotive Control System for Engine, Driveline, and Vehicle," SAE International, 2000, pp. 127-131.

*Primary Examiner*—Rodney H. Bonck
(74) *Attorney, Agent, or Firm*—Fredrick V. Owens

(57) ABSTRACT

A hydraulic coupling system includes a pump, a controller, a clutch assembly, and a valve. The clutch assembly includes an actuator and a multi-disk clutch pack coupled to the actuator. Under the direction of the controller, the pump pressurizes a fluid in the actuator to engage the clutch pack and pumps the fluid through the clutch pack to cool the clutch pack. The valve maintains the fluid pumped to the actuator at a higher pressure than the pressure of the fluid pumped through the clutch pack to cool the clutch.

4 Claims, 16 Drawing Sheets

U.S. PATENT DOCUMENTS

| | | |
|---|---|---|
| 5,148,903 A | 9/1992 | Kobayashi et al. |
| 5,197,583 A | 3/1993 | Sakai et al. |
| 5,377,800 A | 1/1995 | Sperduti et al. |
| 5,495,927 A | 3/1996 | Samie et al. |
| 5,501,311 A | 3/1996 | Wakahara |
| 5,518,098 A | 5/1996 | Zanetel et al. |
| 5,538,121 A | 7/1996 | Hering |
| 5,644,916 A | 7/1997 | Hayasaki |
| 5,720,372 A | 2/1998 | Shino et al. |
| 5,845,756 A | 12/1998 | Dairokuno et al. |
| 5,850,898 A | 12/1998 | Bohme et al. |
| 5,875,865 A | 3/1999 | Wakahara et al. |
| 6,098,771 A | 8/2000 | Vu |
| 6,206,163 B1 | 3/2001 | Schneider |
| 6,244,407 B1 | 6/2001 | Kremer et al. |
| 6,263,995 B1 | 7/2001 | Watson et al. |
| 6,398,688 B1 | 6/2002 | Brown et al. |
| 6,443,286 B1 * | 9/2002 | Bratel et al. ............ 192/85 AA |
| 6,446,774 B1 * | 9/2002 | Porter ........................ 192/35 |
| 6,499,812 B1 * | 12/2002 | Gronau et al. ........... 303/113.1 |
| 6,528,959 B1 | 3/2003 | Kitano et al. |
| 6,533,095 B1 | 3/2003 | Mohan et al. |
| 6,578,654 B1 * | 6/2003 | Porter ........................ 180/249 |
| 6,692,402 B1 * | 2/2004 | Nakamori et al. ............. 477/3 |
| 6,849,024 B1 | 2/2005 | Hayashi et al. |
| 2001/0042652 A1 | 11/2001 | Watson et al. |
| 2002/0029948 A1 | 3/2002 | Williams |
| 2002/0046913 A1 * | 4/2002 | Harries ...................... 192/3.58 |
| 2002/0142879 A1 | 10/2002 | Porter |
| 2002/0144851 A1 * | 10/2002 | Porter ........................ 180/247 |
| 2002/0155916 A1 | 10/2002 | Brown et al. |
| 2002/0157890 A1 | 10/2002 | Williams |
| 2003/0033070 A1 | 2/2003 | Amanuma et al. |
| 2003/0085062 A1 * | 5/2003 | Bowen ...................... 180/65.1 |
| 2003/0089573 A1 * | 5/2003 | Ackermann ............... 192/85 A |
| 2004/0159523 A1 | 8/2004 | Duan et al. |

* cited by examiner

HYDRAULIC COUPLING SYSTEM

RELATED APPLICATIONS

This application claims the benefit of the filing date under 35 U.S.C. §119(e) of U.S. Provisional Application Nos. 60/447,809 and 60/447,810, both filed Feb. 14, 2003, the entire contents of which are incorporated herein by reference.

BACKGROUND

The present invention relates generally to power transmitting systems for motor vehicles. More specifically, the invention relates to a hydraulic coupling system.

Power transmitting systems for motor vehicles that distribute torque between the front and rear wheels are known. In some systems, either the front or rear wheels are the primary drive wheels, and the other set are the secondary drive wheels for providing additional traction needed in certain vehicle operating conditions. In these systems, most or all of the torque is transmitted to the primary drive wheels under normal driving conditions. However, when the system detects slippage of the primary drive wheels, a clutch mechanism couples the secondary drive wheels to the primary drive wheels so that a portion of the torque is transmitted to the secondary wheels.

In some vehicles, the torque transfer devices use a wet clutching mechanism to transfer torque between the left and right wheels or between the front and rear wheels. The performance of these wet clutching devices can degrade when subjected to repeated engagement duty cycles with high loads because of the significant generation of heat created through friction in the clutch.

BRIEF SUMMARY

The present invention features a hydraulic coupling system with a pump/motor assembly, an electronic control unit, a clutch pack assembly, and a valve assembly. The clutch assembly includes an actuator and a multi-disk clutch pack coupled to the actuator. Under the direction of the controller, the pump pressurizes a fluid in the actuator to engage the clutch pack and pumps the fluid through the clutch pack to cool the clutch pack. The hydraulic system return oil is used to cool the clutch; therefore, the cooling fluid pressure is determined by return line design and amount of fluid that passes through it.

The valve, and in some implementations the pump, can be pulse width modulated under the direction of the controller.

The system may include a two-way valve or a pilot valve which holds a preload pressure to the system when the pump is not operating and the clutch pack is disengaged. The system may include an accumulator for compensating for fluid leakage in the system. The pump may be a gerotor, gear, vane, or any other type of pump.

The clutch assembly may be integrated with the driveline component in a single unit, such that a hypoid shaft and a propeller shaft are coupled through the clutch assembly. The clutch assembly may be incorporated in a housing. An axle pinion gear may be coupled to the clutch assembly. The pinion gear may be supported in the housing by two opposing tapered-roller bearings.

Other features and advantages will be apparent from the following drawings, detailed description, and claims.

BRIEF DESCRIPTION OF THE DRAWINGS

The accompanying drawings, incorporated in and forming a part of the specification, illustrate several aspects of the present invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
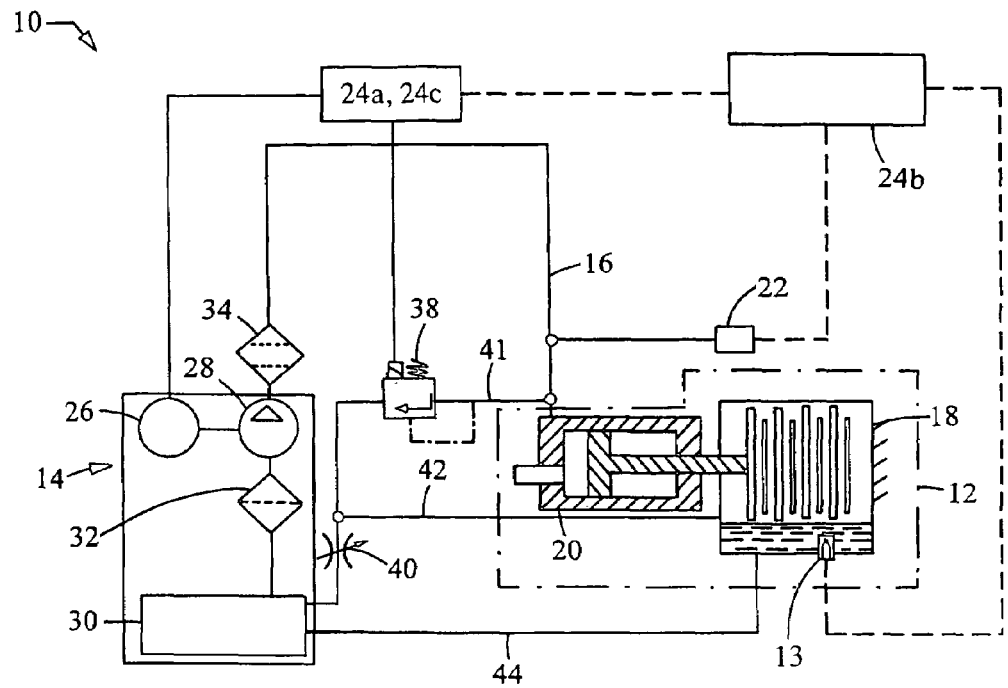
FIG. 1 is a diagrammatic representation of a hydraulic coupling system in accordance with the invention.

FIG. 1 illustrates a hydraulic coupling system generally identified as 10. The system 10 includes a hydraulic coupler or clutch 12 and a pump/motor assembly 14. The hydraulic coupler 12 includes a clutch pack 18 coupled to an actuating cylinder or piston 20. The actuating cylinder 20 is connected to the pump/motor assembly 14 through a supply line 16. A pressure transducer 22 detects the pressure in the supply line 16 and transmits signals to an electronic control unit ("ECU") 24b that monitors and controls the operation of the system 10. Temperature in the clutch pack 18 is monitored with a temperature sensor 13, such as a thermocouple, which transmits signals to the ECU 24b.

The pump/motor assembly 14 includes a motor 26, running at a constant speed, which operates a positive displacement pump 28, such as a vane, gerotor or gear-type pump. The pump 28 pumps a fluid, such as a hydraulic fluid or oil, from a reservoir 30 to the cylinder 20 of the hydraulic coupler 12 through the supply line 16. Increasing pressure in the cylinder 20 engages the clutch pack 18. A strainer 32 and filter 34 filter particulates that may be present in the fluid in the reservoir 30 to prevent damage to the hydraulic components in the system and to cleanse the hydraulic fluid in the system 10 as the fluid circulates through the system. A pressure control valve 38, which is controlled by the ECU, is provided to control system pressure in line 16 and in cylinder.

When the system 10 is in operation, the control valve 38 is under the direction of the ECU 24b to control the system pressure. When the coupler 12 is disengaged, the control valve 38 is not energized and the system fluid pressure is at a minimum, and the motor 26, connected to ECU 24b via a relay switch 24a, output power is reduced to match the hydraulic system loss. When the coupler 12 is engaged the system pressure is determined by the pulse width modulated ("PWM") signal from the PWM driver 24c connected to the ECU 24b that controls the operation of the valve 38.

Through PWM control of the control valve 38, a variable pressure fluid supply is applied to the actuating cylinder 20 of the clutch pack 18. An orifice 40 is also positioned in the return flow line 41 to distribute the required amount of flow to cooling the clutch plate.

In sum, all fluid that moves past the control valve 38 is diverted either through the supply line 42 to the clutch lubrication port of the clutch pack 18 or returned to the reservoir 30. This by-pass circuit prevents the possibility of delivering too much fluid to the clutch pack 18 assembly. Therefore, the orifice 40 is sized to deliver an optimized amount of fluid to the clutch pack 18, while permitting the return of fluid to the device reservoir 30. The reservoir 30 can be optimized and provided with baffles to reduce fluid return turbulence and aeration.

Note that many prior art torque transfer devices rely on friction disk cooling through splash or passive-type lubrication, which may or may not deliver adequate fluid for proper lubrication and cooling. Passive lubrication can vary with rotational speed of the clutch components and with vehicle pitch and roll. If a sufficient amount of fluid is not delivered, the result is excessive clutch heat leading to noise, vibration, and harshness ("NVH") issues, as well as clutch wear. In contrast, the system 10 provides hydraulic fluid or oil to the clutch pack 18 at all times to ensure proper cooling and clutch performance. The hydraulic pump/motor assembly 14 provides pressurized fluid to both the actuation system (i.e. fluid to the actuating cylinder 20) and the lubrication/cooling circuit (i.e. fluid supplied to the clutch pack 18 via supply line 42, and fluid removed from the clutch pack 18 via return line 44). In sum, the lubricating and cooling hydraulic fluid is actively pumped in a continuous manner to the clutch pack 18 to provide proper clutch lubrication for sustained engagement events. Furthermore, heat generated from the clutch material is distributed to the lubricating fluid in a continuous manner to cool the clutch pack 18.

Figure 2:
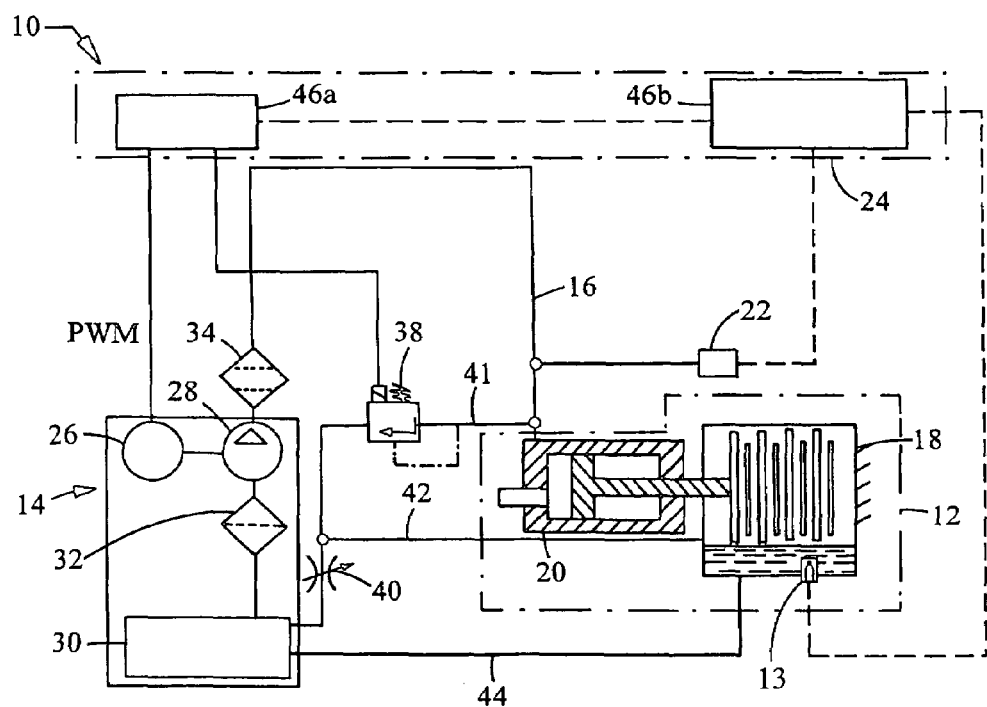
FIG. 2 is a diagrammatic representation of an alternative arrangement of a hydraulic coupling system in accordance with the invention.

A modification of the above described system provides PWM duty cycle control of the motor 26 as illustrated in FIG. 2, allowing for some reduction in electrical energy usage in certain operating conditions. In this implementation, the ECU 24 includes a PWM capable driver module 46a and a microcontroller 46b. The driver module 46a receives PWM duty cycle signals from the microcontroller 46b and provides PWM control signals to the motor 26. When the system 10 is in a disengaged condition, the control valve 38 is not energized and the system fluid pressure is at a minimum, while at the same time the PWM signal from the ECU reduces the output speed of the motor 26, and therefore reduces the output flow of the pump 28. This is unlike the implementation of the system 10 shown in FIG. 1, in which the motor 26 operates continuously at 100% whether or not the clutch pack 18 is engaged. Thus, with the implementation shown in FIG. 2, the power usage of the system 10 is decreased when in the clutch is in a disengaged condition. When the clutch pack 18 is to be engaged for full power, the PWM signal instructs the motor 26 to operate at or near 100%. Thus, the PWM signal to the motor 26, as well as to the control valve 38, regulates the system fluid pressure, whereas in the implementation shown in FIG. 1, the PWM signal to the control value solely regulates the pressure in the system.

Figure 3:
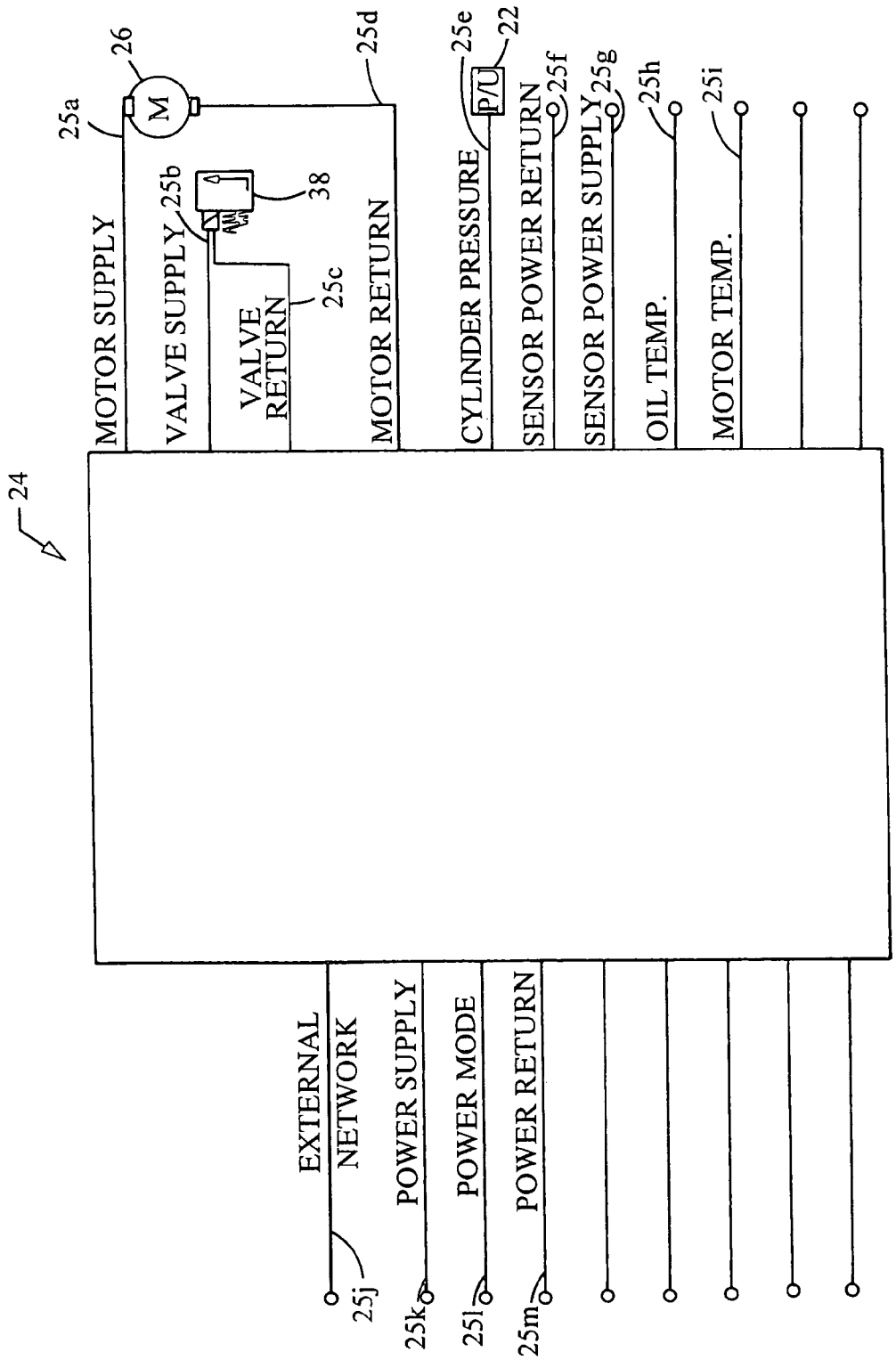
FIG. 3 illustrates an electronic control module for the hydraulic coupling system of FIG. 2.

A PWM capable ECU controller, as shown in FIG. 3, incorporates both the microcontroller 46b and the PWM capable driver modules 46a. In some implementations, the ECU unit is integrated onto the hydraulic valve body to minimize packaging, weight and cost. The ECU controller 24 shown in FIG. 3 has multiple connection pins 25a–25m. The motor 26 and the valve 38 receive PWM control signals through the pins 25a and 25b, and are grounded through the pin 25c and 25d, respectively. The ECU controller 24 is also grounded to a battery through the pin 25m. Motor current is monitored internal to the ECU, and the cylinder pressure as monitored by the sensor 22 is transmitted to the ECU controller through the pin 25e. The sensor 22 also receives a power supply through the pin 25g. The sensor return pin 25f connects to the sensor power return line. Power Mode pin 25l either wakes up the ECU or shuts it down. The power supply 25k powers up the ECU. The ECU controller 24 is further connected to an external communication network through the pin 25j and receives oil temperature and motor temperature signals through the pins 25h and 25i, respectively.

The system 10 can energize the hydraulic system motor 26 and pump 28 immediately at ignition to permit immediate clutch engagement for four-wheel drive traction. The clutch pack 18 need not be fully engaged or fully disengaged. Rather, the clutch pack 18 provides a range of torque through-put depending on the torque distributions requirements between the front and rear wheels or between the left and right wheels. Accordingly, in some situations clutch slippage is expected and desired.

Figure 4:
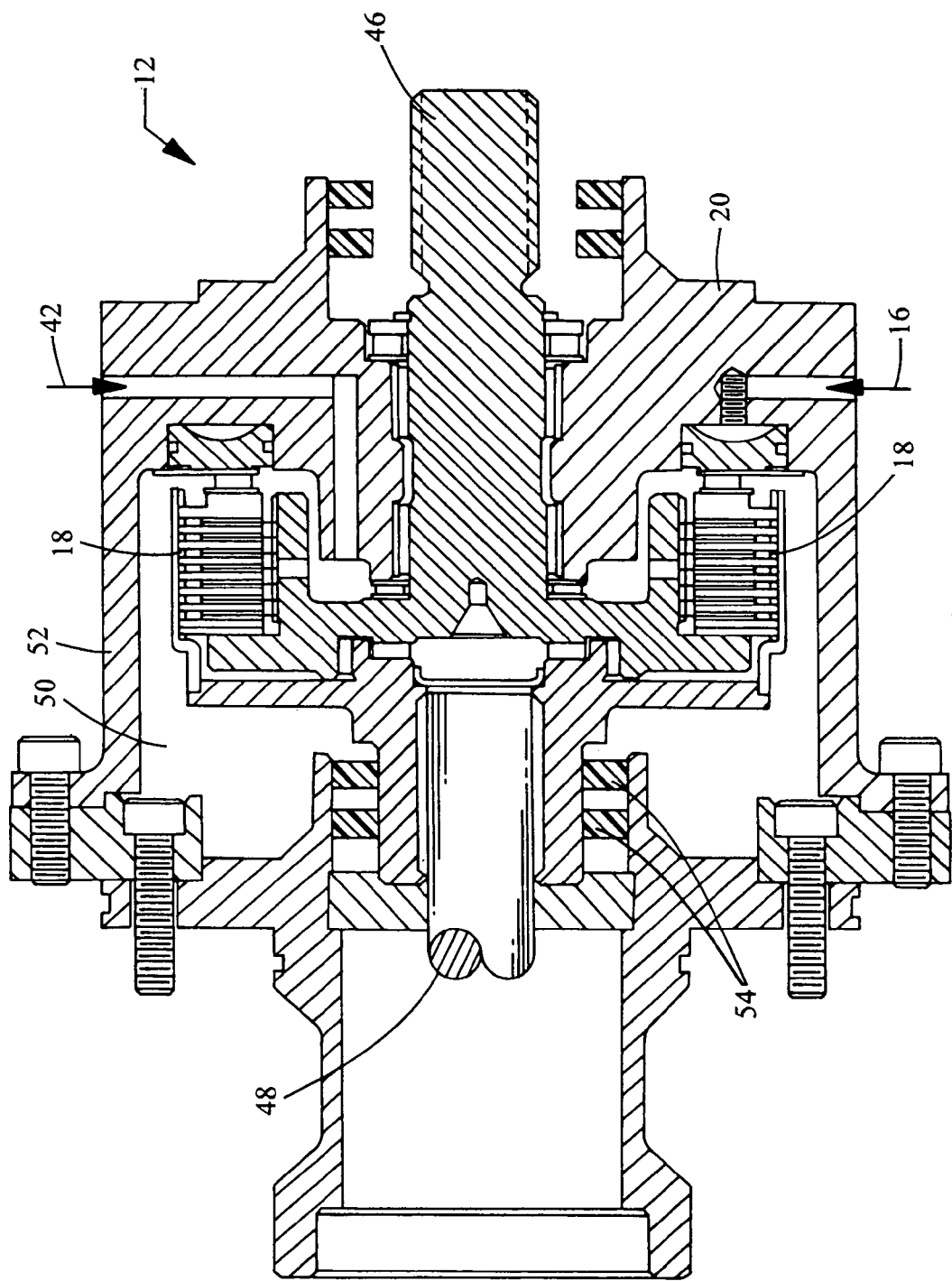
FIG. 4 is a cross-sectional view of a hydraulic coupler of the coupling systems of FIGS. 1 and 2.

The system 10 can be mounted to or integrated with a front or rear wheel axle differential. FIG. 4 illustrates such an arrangement with a propeller shaft 46 coupled to a hypoid shaft/gear 48 through the coupler 12. The propeller shaft 46 turns continuously in this configuration. Application of the coupler 12 would couple the spinning propeller shaft 46 to the rear axle differential via the hypoid shaft/gear 48 in a controlled manner.

As shown in FIG. 4, the actuating cylinder or piston 20 acting on the clutch pack 18 has an annular shape. The amount of fluid pressure in the supply line 16 determines the level of engagement between the propeller shaft 46 and the hypoid shaft 48. As mentioned above, the supply line 42 provides hydraulic fluid to the clutch pack 18 for both lubricating and cooling purposes. The cooling fluid circulates in a chamber 50 enclosed within a housing 52 and exits the chamber through the return line 44 (FIG. 1). A pair of shaft seals 54 prevents the operating and cooling fluid from mixing with the rear differential axle fluid.

Figure 5A:
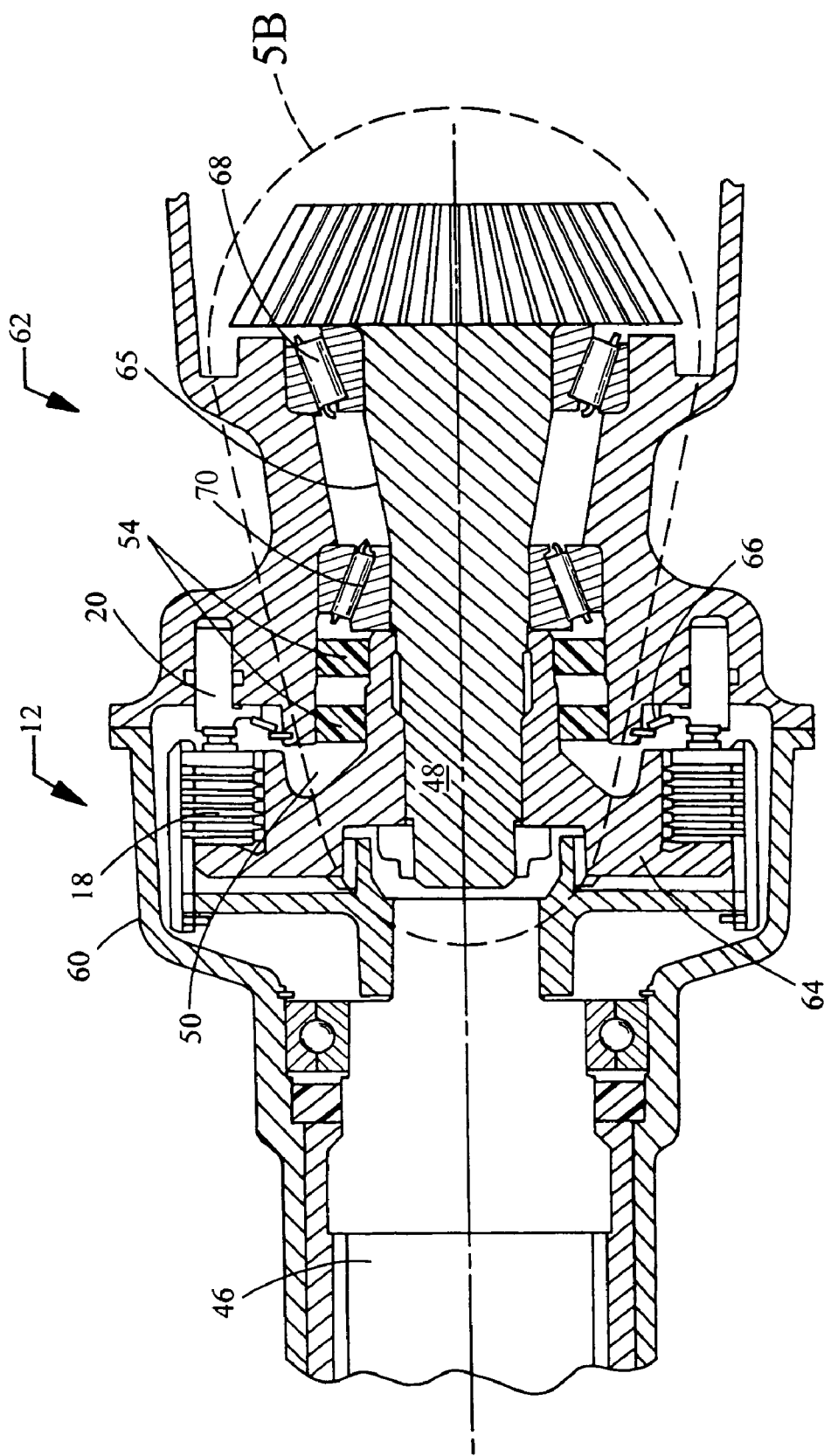
FIG. 5A is a cross-sectional view of a hydraulic coupler integrated with a differential unit in accordance with the invention.

The coupler 12 can be combined with the driveline component into one integrated configuration as shown in FIG. 5A. Here, the coupler 12 is incorporated into a housing 60 of a rear axle differential 62. As such, an output hub 64 of the coupler 12 is coupled in an integrated manner to an axle pinion gear 65 of the hypoid. This cross-section also illustrates a Bellville-type return spring 66 that opposes the stroking movement of the actuating piston 20 towards engagement of the clutch pack 18. Again, it should be noted that the axle lubricant is separated from the clutch operating and cooling hydraulic fluid circulating in the chamber 50 with the pair of serial shaft fluid seals 54.

Figure 5B:
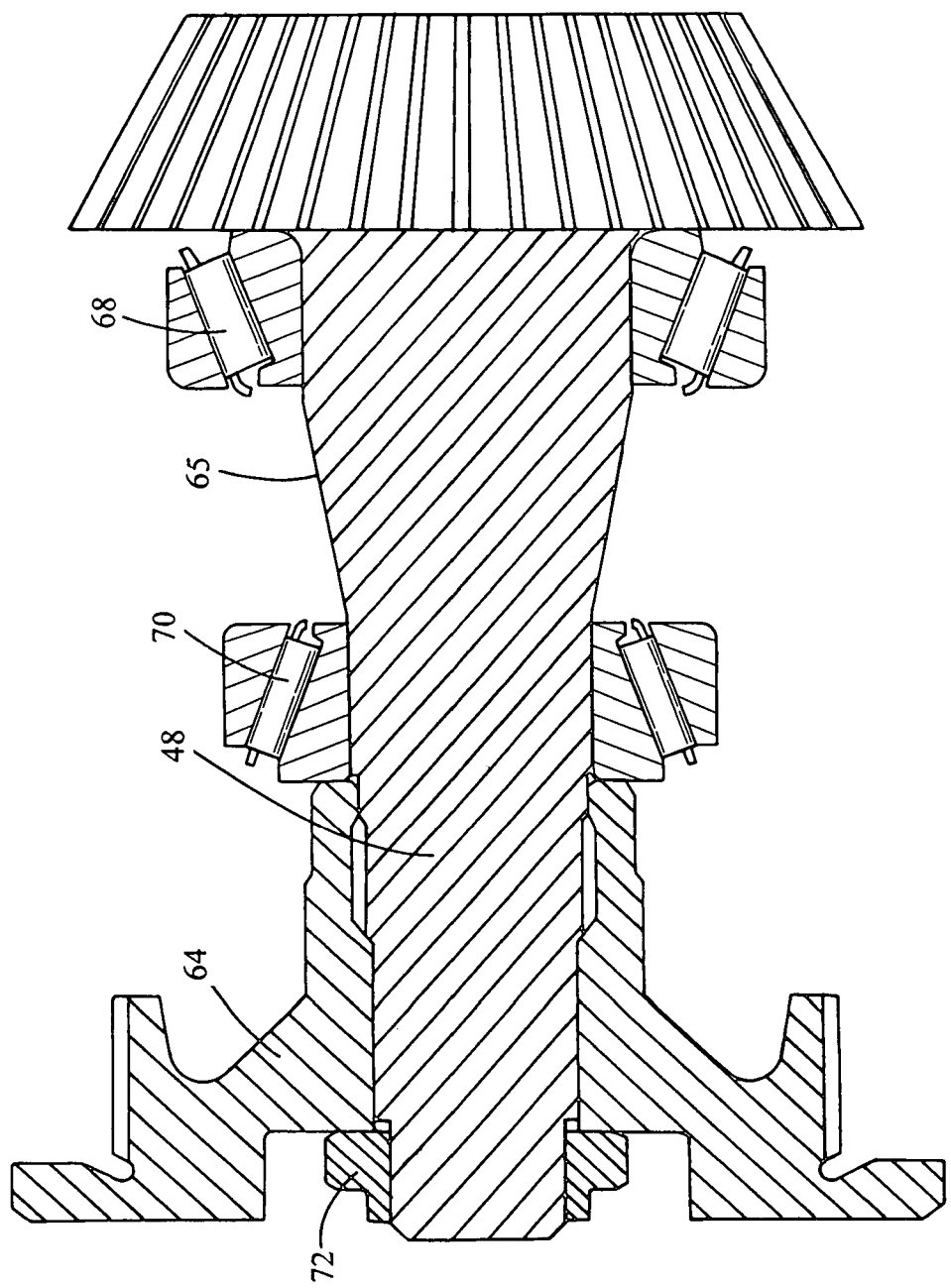
FIG. 5B illustrates a bearing support structure of the integrated unit of FIG. 5A.

Referring also to FIG. 5B, the pinion gear 65 is supported by two opposing tapered-roller bearings 68 and 70. Integrating the output hub 64 onto the gear 65 makes use of the bearings to support the hub 64 and hence a portion of the coupler 12, eliminating the need for additional support bearings and structure. Accordingly, the number of parts required in the system as well as the overall size and weight of the system are reduced.

The coupler hub 64 is attached to the pinion gear 65 with a spline on the shaft 48 of the pinion gear 65. The hub 64 is secured on this spline with a locking nut 72 threaded to the shaft 48 of the pinion. The axial thrust loads of the coupler 12 are transmitted through the hub 64 to the nut 72. Therefore, all radial and axial loads are supported by the two tapered-roller bearings 68 and 70.

Figure 5C:
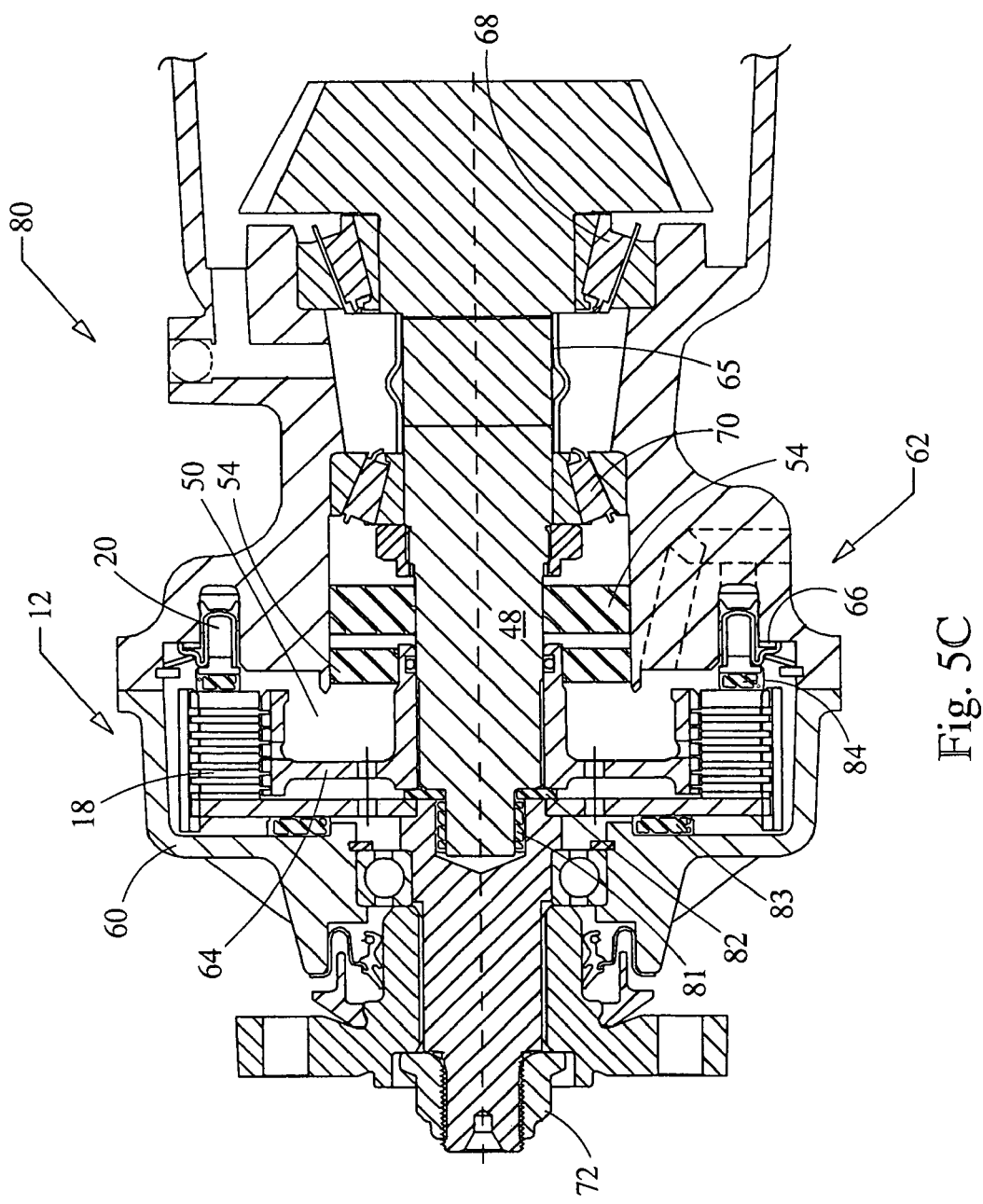
FIG. 5C is a cross-sectional view of another hydraulic coupler integrated with a differential unit in accordance with the invention.

FIG. 5C is a cross-sectional view of another unit 80 with the hydraulic coupler 12 integrated with the differential unit 62 in the housing 60. The unit 80 includes radial and axial bearings, 81 and 82, respectively, for the shaft 48, as well as bearings 83 and 84 for the coupler 12. Other features of the unit 80 corresponding to those of the integrated unit shown in FIGS. 5A and 5B are identified by like reference numerals.

Figure 6A:
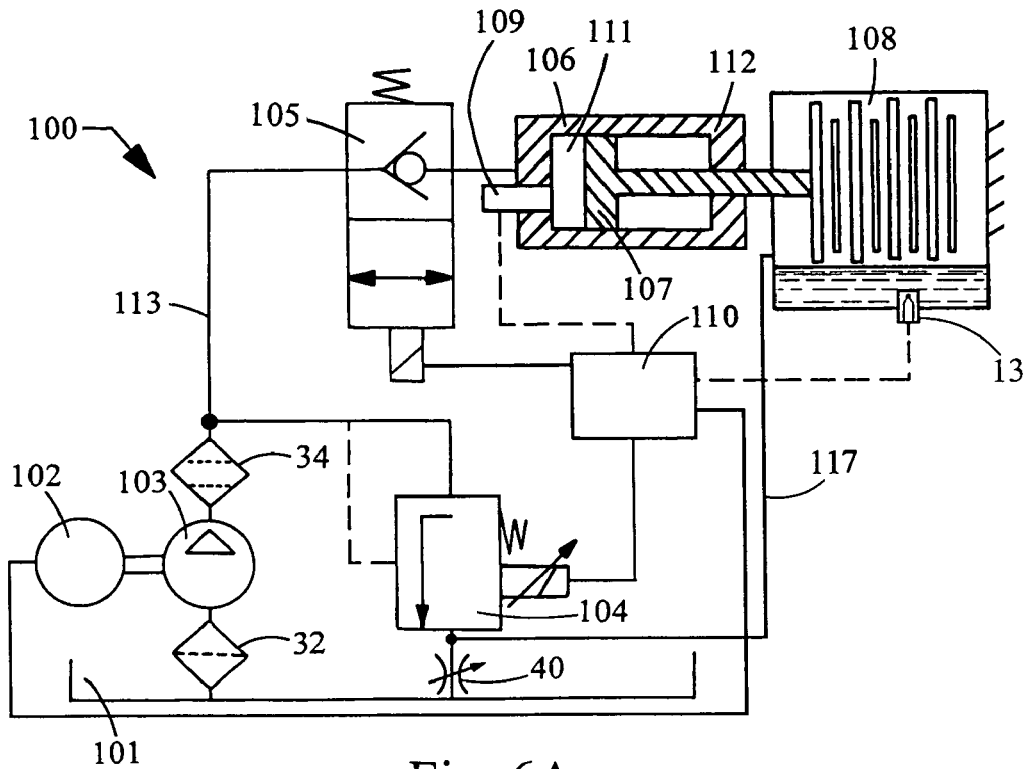
FIGS. 6A–6C illustrate an alternative embodiment of a hydraulic coupling system in accordance with the invention.
Figure 6B:
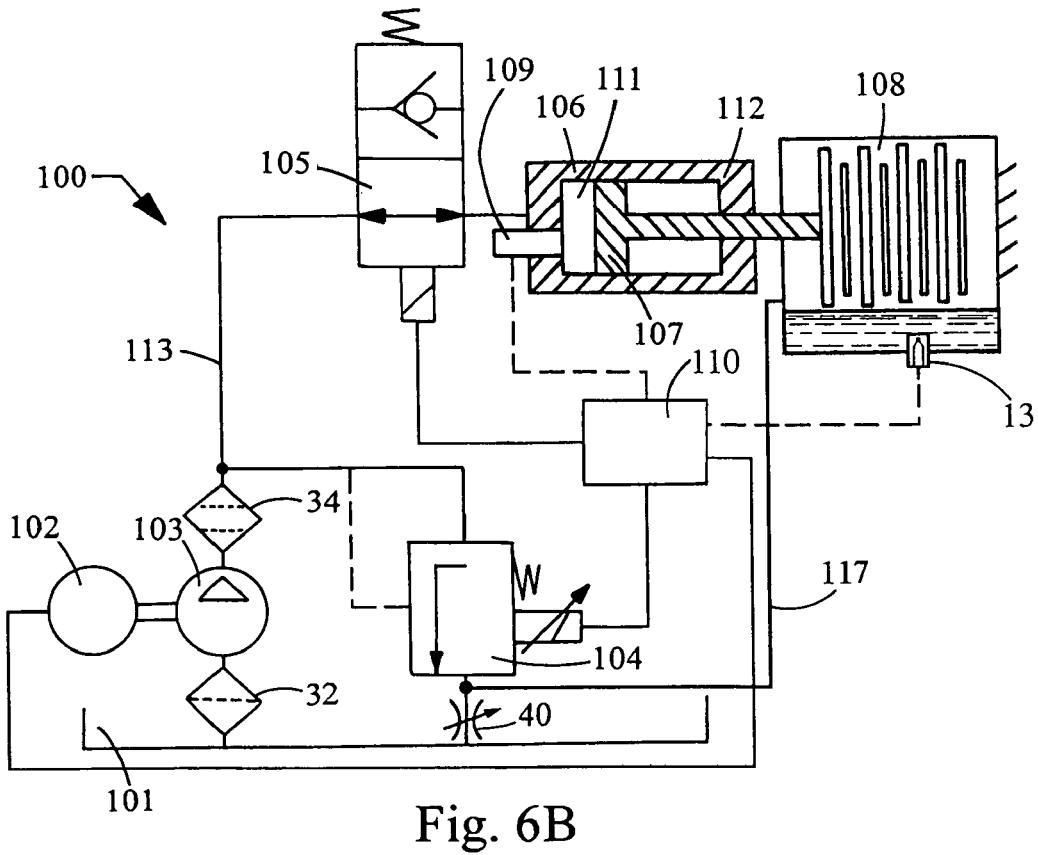
Figure 6C:
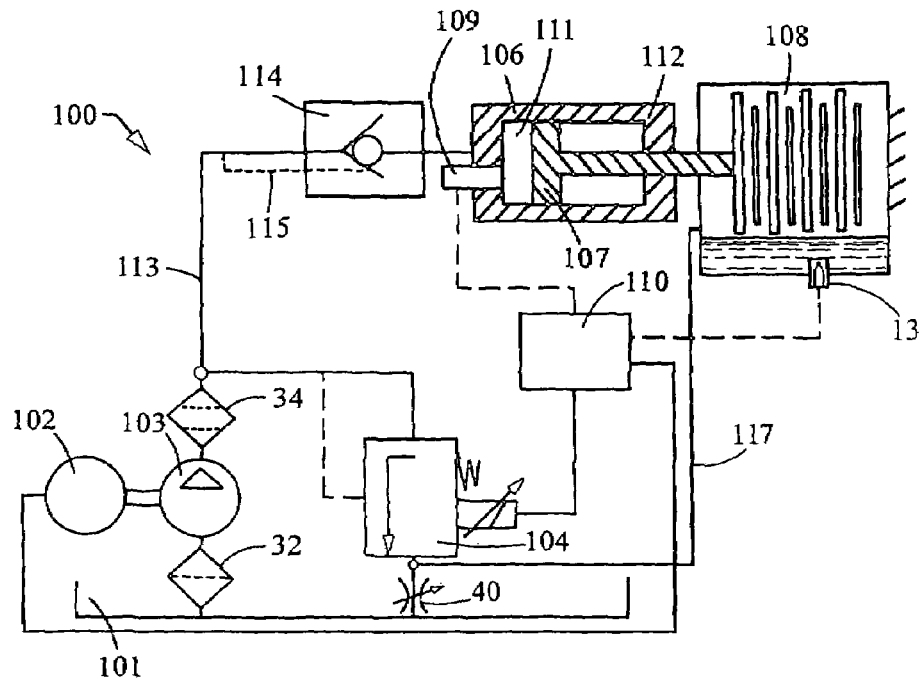

In certain embodiments of the invention, a simple and low cost method is employed to hold the clutch pack preload pressure or load when the pump is not operating. For example, FIGS. 6A–6C depict a hydraulic coupler system 100 with a hydraulic pump 103 driven by an electric motor 102. The pump 103 draws fluid from a reservoir 101 and delivers the fluid to a cylinder chamber 111 defined by the interior of the walls 106 of a cylinder 112. A proportional relief valve 104 controls the system fluid pressure. Increasing the pressure of the hydraulic fluid pushes a cylinder piston 107 to engage a clutch pack 108. A 2-way valve 105 holds the system preload pressure when the clutch is disengaged, and allows the fluid to flow freely in both directions when the clutch pack 108 is in an engaged condition. The proper amount of lubricant is maintained in the clutch pack 108 via a lube line 117.

When the system 100 is in a disengaged condition, the 2-way valve 105 is not energized, that is, it is located in position 1, as shown in FIG. 6A. In this position, fluid can only flow from the pump 103 through a flow line 113 to the cylinder chamber 111, and cannot flow back from the cylinder chamber 111 to the pump 103. Once the pressure in the cylinder chamber 111, detected by a pressure sensor 109, reaches the upper threshold of the preload pressure, an ECU 110 sends out a signal that turns the electric motor 102 and hence the pump 103 off. At the same time, the pressure control valve is set at the upper threshold of the preload pressure. Because the cylinder chamber 111 is sealed and the check valve 105 prevents backflow when it is in position 1, fluid leakage is minimized, such that the preload pressure in cylinder chamber 111 is held for a longer period of time. If over time, the pressure sensor 109 sends a signal to the ECU 110 that the pressure is lower than a minimum preload pressure threshold, the ECU turns the electric motor 102 on until the pressure reaches an upper threshold.

The 2-way valve 105 can also prevent the system from interacting or interfering with an Anti-Lock Braking system from clutch preload. For example, in the preload condition, if the ECU 110 determines that the Anti-Lock Braking System is active, the ECU 110 sends out a signal to energize the 2-way valve 105 and to release the pressure in the chamber 111, and therefore, fully disengage the clutch pack 108.

When the system 100 is in an engaged condition, the 2-way valve 105 is energized (i.e. position 2 shown in FIG. 6B). In this position, fluid can flow back and forth between the pump 103 and the cylinder chamber 111. The ECU 110 regulates the valve 104 input current to control the system pressure to produce the required clutch engagement torque.

Another type of valve that can be used in place of the 2-way valve is a pilot check valve 114 shown in FIG. 6C. The pilot check valve 114 is closed when the pressure in a pilot control line 115, which is connected with pump output line 113, is lower than its setting threshold pressure. When the valve 114 is closed, fluid flows from the pump 103 through the flow line 113 to the cylinder chamber 111 and cannot flow back in the reverse direction from the cylinder chamber 111 to the pump 103. Once the pilot control line pressure is higher than the threshold value, the fluid can flow in either direction. The valve open threshold is set to be equal to the clutch plate upper threshold of the preload pressure. In the disengaged condition, when the signal from the pressure sensor 109 reaches a preload upper threshold, the ECU 110 turns the electric motor 102 off. Once the motor 102 is turned off, the pilot pressure of the check valve 114 decreases below the check valve open threshold and the fluid in the cylinder chamber 111 is prevented from flowing back through the check valve 114, and the pressure in the cylinder chamber 111 is held at the desired preload level. The pump 102 is inactive until the ECU 110 sends out a signal to engage the clutch pack 108, or if the cylinder chamber pressure is lower than the clutch preload lower threshold. When the clutch pack 108 is to be engaged, the electric motor 102 turns on, and the system pressure is controlled by the proportional relief valve 104. Once the control pressure is higher than the check valve opening threshold, the pressure in the cylinder chamber is controlled according to clutch plate engagement torque requirements.

Figure 7A:
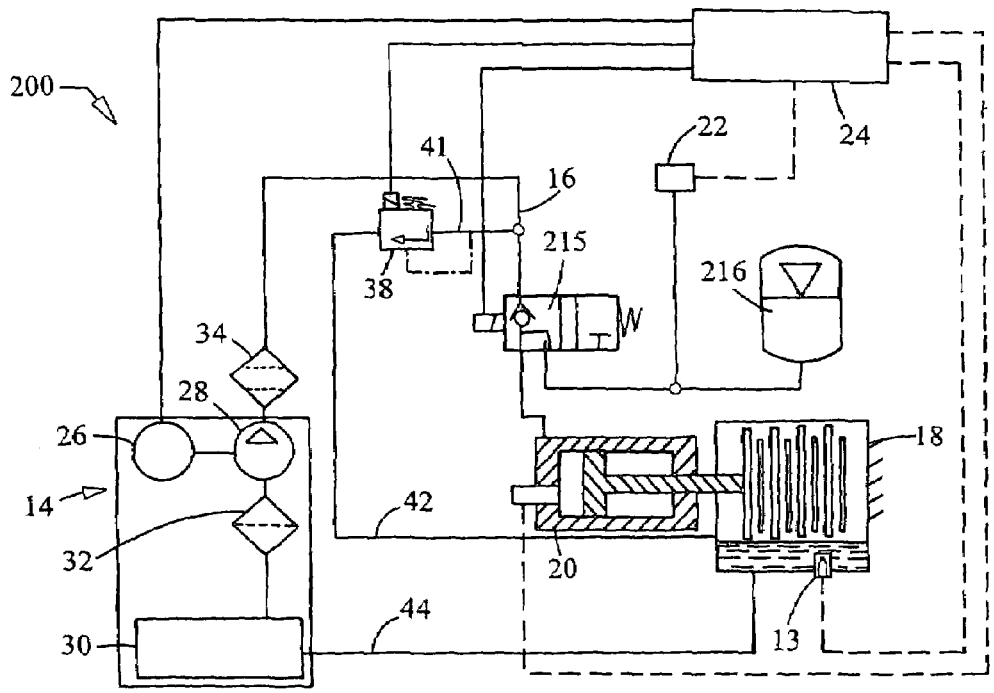
FIGS. 7A and 7B illustrate another alternative embodiment of a hydraulic coupling system in accordance with the invention.
Figure 7B:
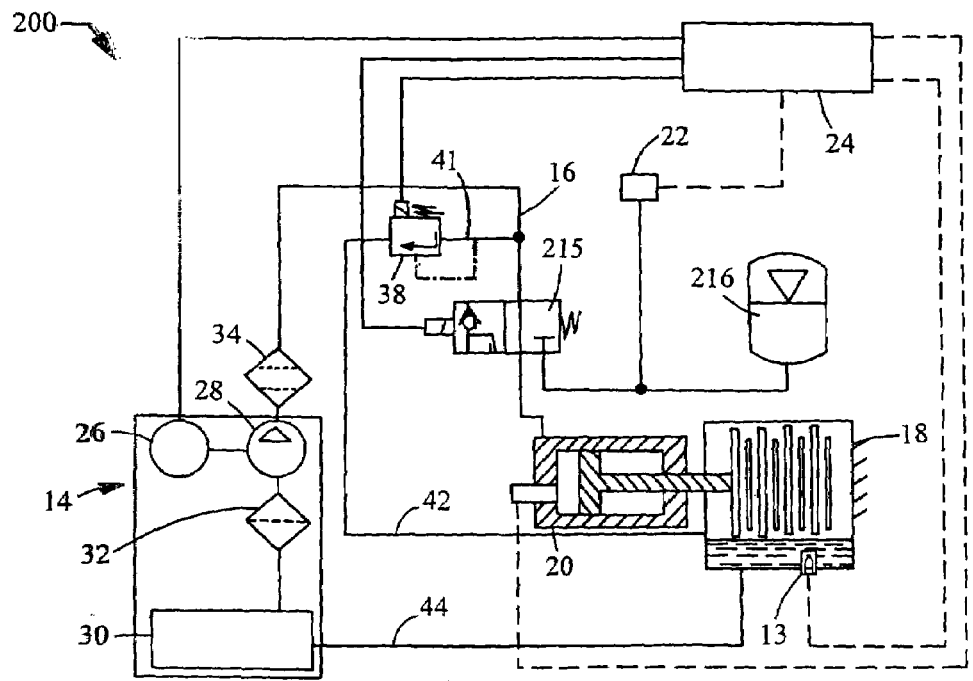

Another embodiment is shown in FIGS. 7A and 7B as a hydraulic coupling system 200. Note that like reference numerals identify corresponding parts in the system 10 shown in FIGS. 1 and 2. The system 200 is similar to the system 10 shown in FIG. 1 except that a three way two position valve 215 and a lower pressure accumulator 216 are added to system. When the clutch pack 18 is to be engaged, the valve 215 is disengaged, as shown in FIG. 7B. As such, the accumulator 216 is disconnected from the system 200 and the system pressure is controlled by the control valve 38 as in the system 10 of FIG. 1. When the clutch pack has been disengaged, the valve 215 is engaged as shown in FIG. 7A, and the accumulator 216 is connected to the actuating cylinder 20. If the pressure of the accumulator 216 is higher than the lower cylinder preload threshold pressure, the hydraulic pump/motor assembly is turned off, and the accumulator 216 compensates for fluid leakage from the cylinder 20. When the cylinder pressure is lower than the lower cylinder preload threshold, the motor 26 turns on and the pump 28 charges the accumulator 216 until its pressure reaches the upper cylinder preload threshold. During the charging process, the pressure control valve 38 is set at the cylinder upper preload threshold pressure.

Figure 8A:
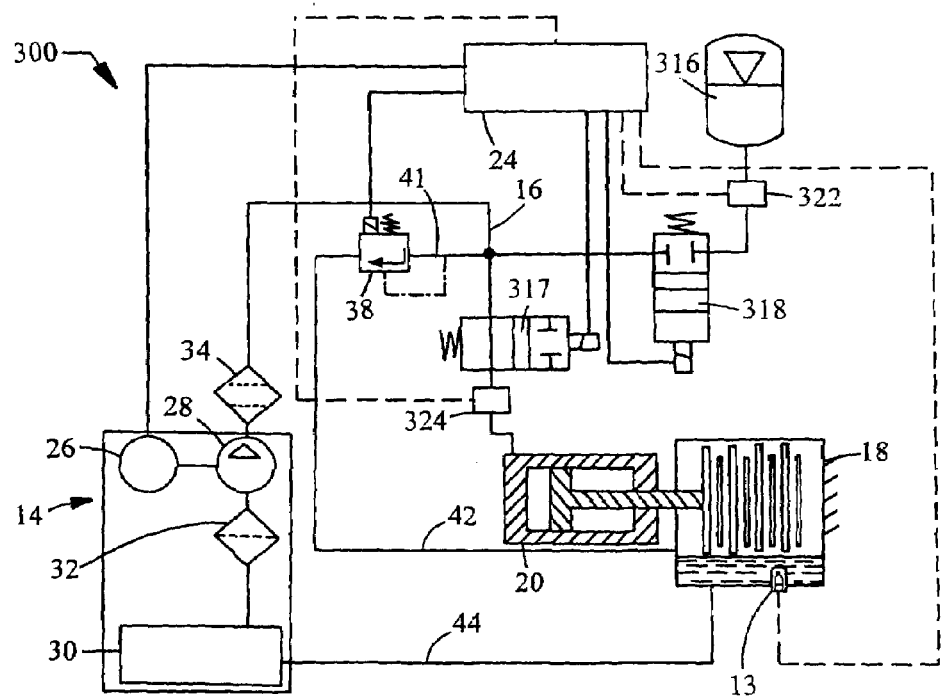
FIGS. 8A–8C illustrate yet another alternative embodiment of a hydraulic coupling system in accordance with the invention.
Figure 8B:
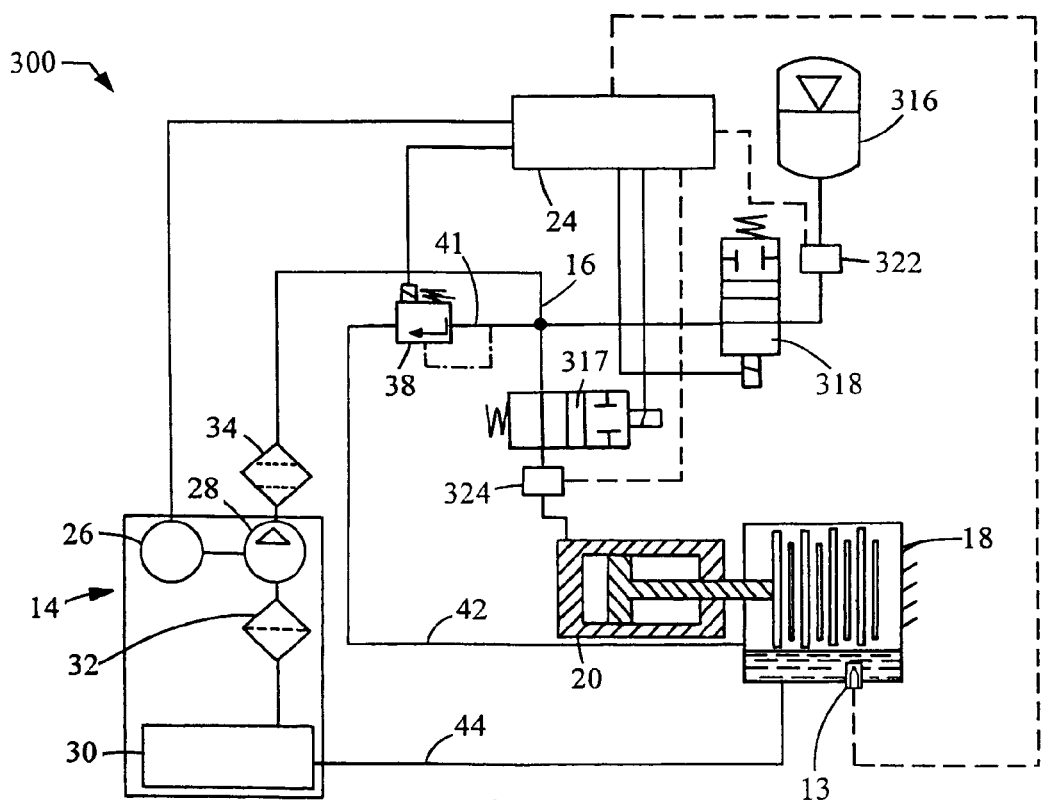
Figure 8C:
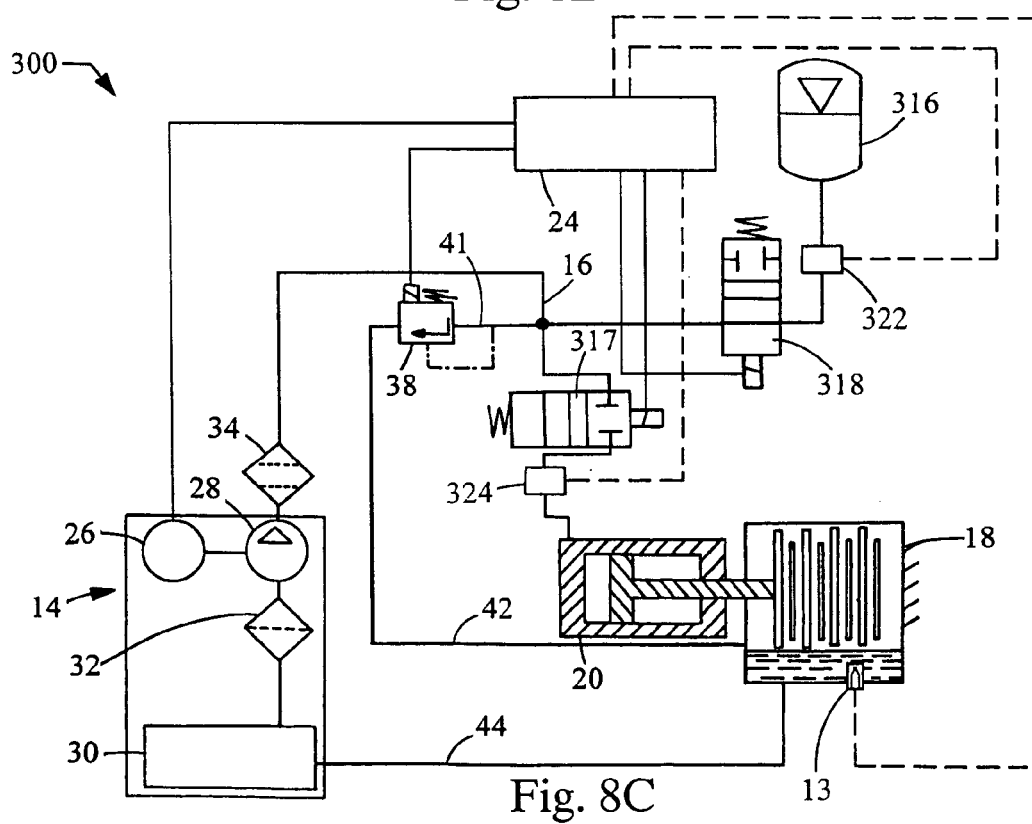

Another embodiment shown in FIGS. 8A–8C as a system 300 is also similar to the system 10 of FIG. 1, except that the system 300 includes two two-way position valves 317, 318 and an accumulator 316. The system 300 is also provided with pressure sensors 322 and 324. Under normal diving conditions, the motor 26 is off and the valves 317 and 318 are de-energized as show in FIG. 8A. In this condition, the clutch pack 18 is fully disengaged and the higher pressure accumulator 316 pressure is equal to or higher than the maximum system working pressure. When clutch pack is to be engaged, the motor 26 is turned on by the ECU 24 and the valve 317 remains de-energized, while the valve 318 is energized as shown in FIG. 8B. As such, both the accumulator 316 and the pump 28 supply fluid to the actuating cylinder 20 for rapid cylinder movement. During the process, fluid stored in accumulator 316 is discharged, so that the pressure of the accumulator 316 begins to decrease. Once the pressure in the actuating cylinder 20 reaches the level of the accumulator 316, the valve 318 is de-energized back to the position shown in FIG. 8A. In this condition, only the pump 28 sends fluid to the actuating cylinder 20, so that the system 300 works in the same way as the system 10 of FIG. 1. When the ECU 24 determines that the clutch pack 18 is to be disengaged, the ECU 24 drives the control valve 38 to set the system pressure to a minimum value such that the valve 317 becomes engaged. After the clutch plate is disengaged as expected, the valve 317 and 318 is engaged, as shown in FIG. 8C, and the ECU 24 drives the control valve 38 to reset the system pressure to a maximum value. In this condition the pump 28 charges the accumulator 316. Once the accumulator's pressure reaches a predetermined value, valve 318 is first de-energized, then the control valve 38 is de-energized and the pump motor 26 is turned off, and finally valve 317 is de-energized. For this system, the accumulator can also couple with the pump and the valve to control the cylinder pressure during a clutch engagement process to help decrease the system requirement on pump output flow.

Figure 9:
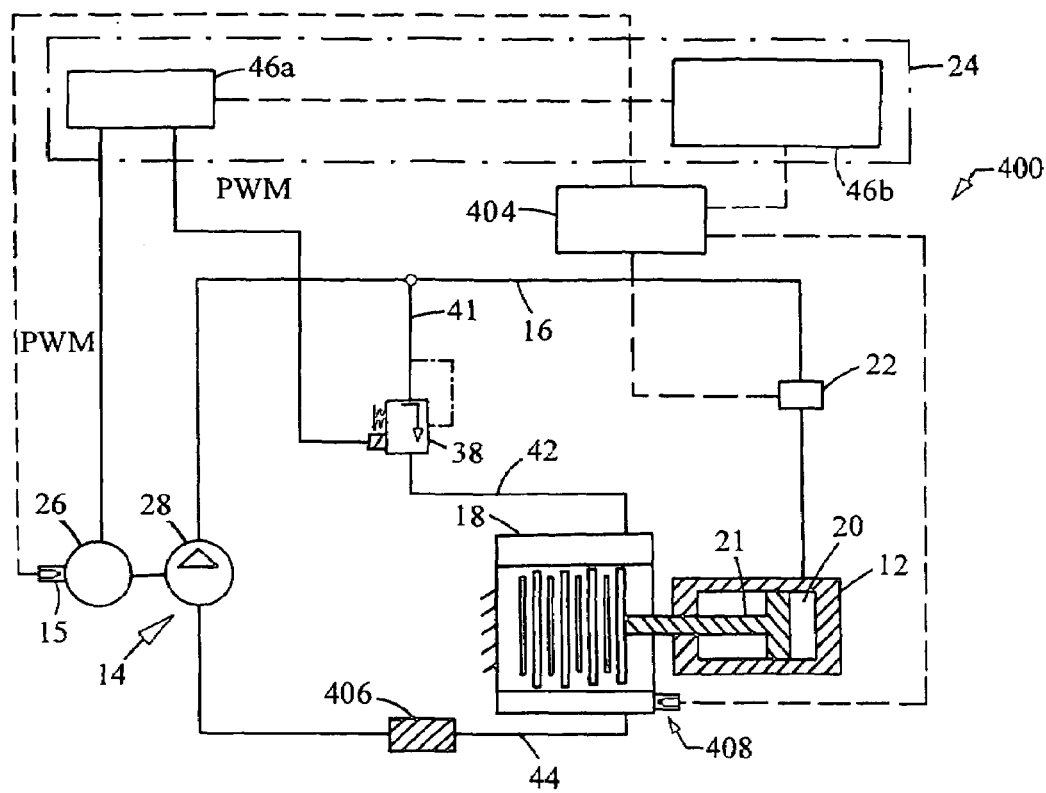
FIG. 9 illustrates another hydraulic coupling system in accordance with the invention.

Referring now to FIG. 9, there is shown another implementation of a hydraulic coupling system identified generally by the reference numeral 400. In addition to the other previously described components, identified in FIG. 9 with like reference numerals, the system 400 includes a signal conditioner 404, a filter 406, and a thermocouple 408. The signal conditioner 404 conditions the pressure signal from the pressure transducer 22 and transmits the conditioned signal to the microcontroller 46b. The filter 406 functions in much the same way as the strainer 32 (FIGS. 1 and 2) described earlier; that is, the filter 406 removes particulates that may be present in the fluid to cleanse the fluid and to prevent damage to the pump 28 and valve 38. The thermocouple 408 provides a signal representative of the temperature of the fluid in the sump of the clutch pack 18 to the microcontroller 46b, and the temperature of the motor 26 is monitored with a temperature sensor, such as a thermocouple 15, coupled to the signal conditioner 404.

As shown in FIG. 9, certain lines, such as line 16, indicate the high pressure side of the system, whereas other lines, such as lines 42 and 44, indicate the lower pressure side of the system. By pressurizing the cylinder 20 in the hydraulic coupler 12, the piston 21 applies a force on the clutch pack 18 which, after overcoming the retraction spring force, engages both sides of the coupler. To maintain a desired pressure in the cylinder, one or more actuators are operated in a controlled manner. Again, the motor 26 of the pump/motor assembly 14 and the valve 38 can be PWM controlled.

FIGS. 10 through 14 describe the control algorithms for the system 400. A higher level controller (such as a vehicle level controller) generates an engagement command of a particular percentage based on the vehicle dynamics (e.g. loss of traction due to acceleration, wheel slip, yaw instability detected via understeer/oversteer conditions check, etc.) and provides this information as a device command 412 (FIG. 10) to the microcontroller 46b. The engagement command is then interpreted by the control algorithms as a pressure command for the electro-hydraulic system 400. This can be done, for example, via a look-up table generated by a dynamometer testing of the clutch pack. While the pressure transducer 22 feeds pressure information back to the microcontroller 46b, the microcontroller 46b tracks the desired pressure (i.e. the pressure command) by transmitting control commands to the driver module 46a to control the pump motor 26 and the valve solenoid 38.

Another aspect of the system 400 is the over-temperature protection of the system. Based on the measured fluid temperature with a thermocouple, the controller 46b reduces the system pressure at the expense of performance degradation. The other thermocouple 15 monitors the motor temperature and protects the motor from over-temperature conditions by reducing the drive command to the motor.

Figure 10:
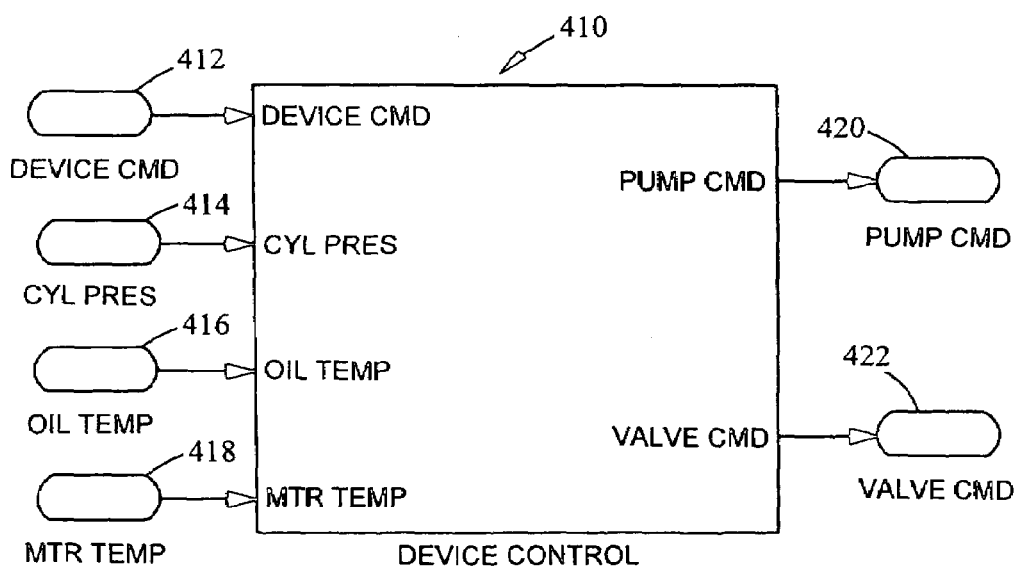
FIG. 10 illustrates a control system for the hydraulic coupling system of FIG. 9.

FIG. 10 is a block diagram of the overall control algorithm for the system 400. The combined operation of the driver module 46a and the microcontroller 46b of FIG. 9 is depicted as a device controller 410. The device controller 410 has four inputs (device command 412, feedback pressure 414, fluid temperature 416, and motor temperature 418) and two output signals (pump motor command 420 and valve command 422).

The device command 412 is typically transmitted from the higher level vehicle controller mentioned above to the microcontroller 46b. The cylinder pressure input 414 represents the pressure as measured by the pressure sensor 22, and the fluid temperature input 416 and the motor temperature 418 represent the temperatures measured by the thermocouple 408 and the thermocouple 15 that monitors the temperature of the motor 26. The pump motor command 420 and the valve command 422 from the driver module 46a directs the motor 26 to operate the pump 28 at a desired pressure and the operation of the valve 38.

Figure 11:
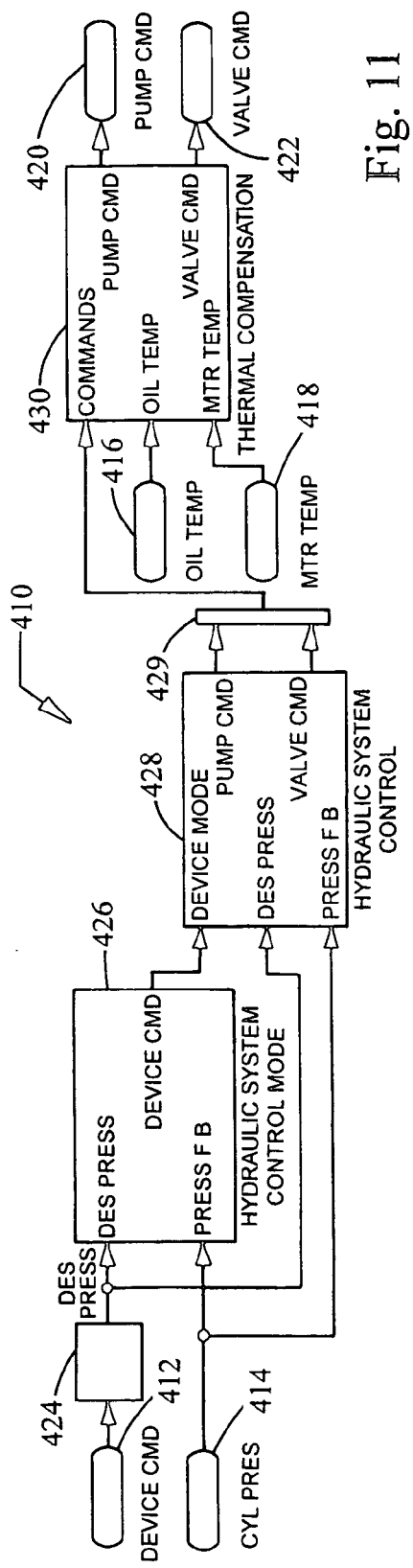
FIG. 11 illustrates a control block diagram for the controller of the hydraulic coupling system of FIG. 9.

FIG. 11 shows a bit detailed description of the controller 410. First, the device command 412 is interpreted as a desired pressure command (DesPress) through a predetermined look-up table 424 (based on, for example, experimental observation). The next block 426 is a mode detection block (identified as a HydraulicSystemControlMode) for the controller which determines the device mode (DeviceMode) based on the desired pressure command (DesPress) from the look-up table 424 and the feedback pressure (PressFB) from the cylinder pressure input 414. The system 400 typically operates in one of three modes: Mode 1 for clutch disengagement; Mode 2 for full clutch engagement; and Mode 3 for partial clutch engagement.

The third block 428 (identified as a HydraulicSystemControl block) contains the control algorithms for the pump motor and the valve solenoid which determines the actuator commands based on the system state (i.e. the Device mode), and the desired pressure (DesPress) and the feedback pressure (PressFB). The pump command (PumpCmd) and the valve command (ValveCmd) outputs are fed to a multiplexer 429 where the command signals are combined as a single input signal fed to a block 430.

The fourth block 430 (identified as a ThermalCompensation block) receives the input from the multiplexer 429 and the fluid temperature input 416 and the motor temperature input 418 and compensates the pump and valve commands (Commands) for temperatures that exceed upper threshold temperatures of the fluid and the motor. The block 430 provides the compensated pump and valve commands as the output pump command 420 and the valve command 422.

Figure 12:
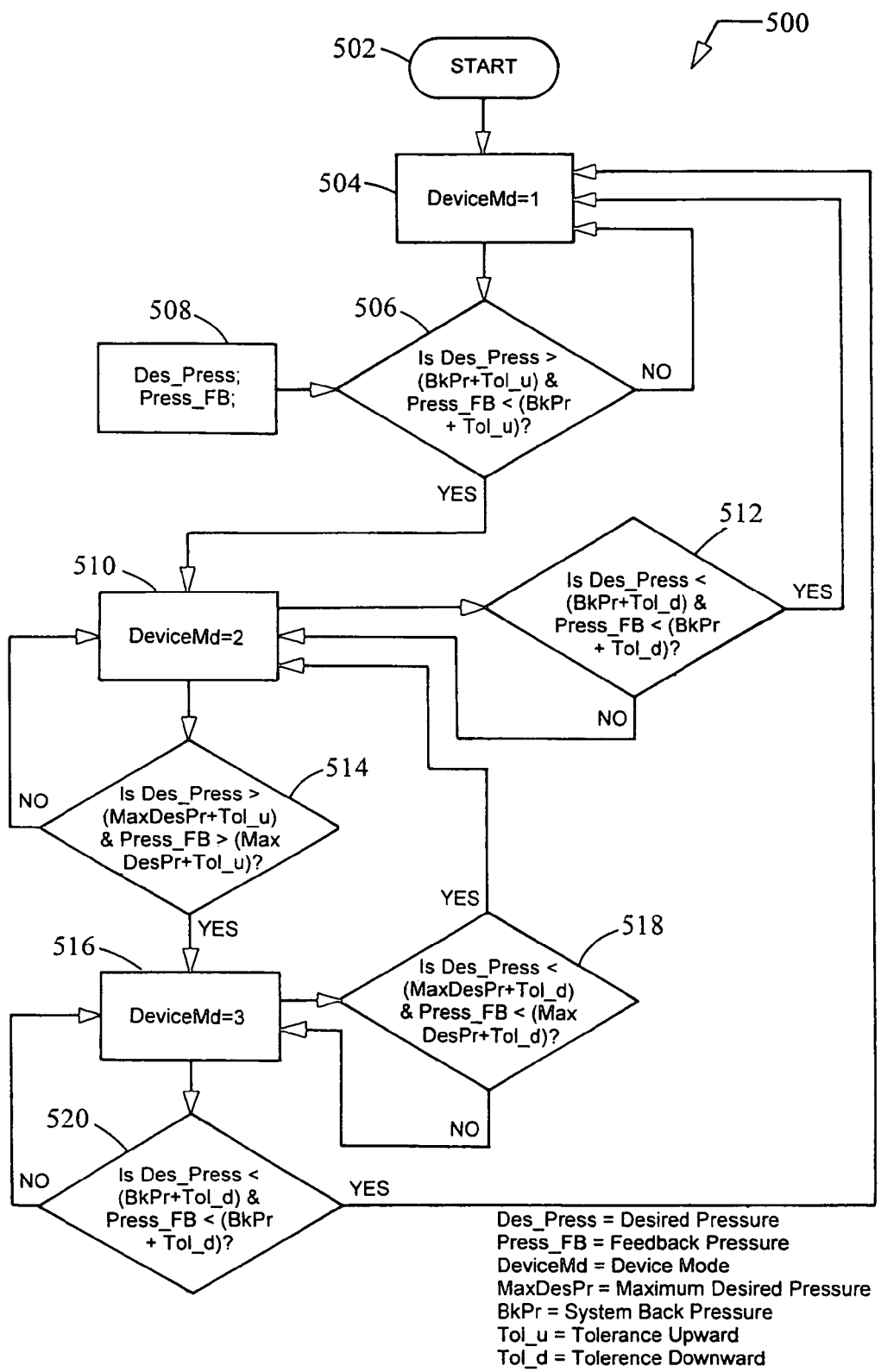
FIG. 12 is a flow diagram of a sequence of steps for the control of the hydraulic coupling system of FIG. 9.

FIG. 12 illustrates a process 500 for the operation of the mode detection block 426 in the form of a flow diagram. Based on the desired pressure and feedback pressure information, as well as other parameters, the process 500 determines the device mode of the system 400. After the process 500 initiates in step 502, process 500 sets the device mode to mode 1 (total disengagement) in step 504 and progresses to the decision step 506, which receives desired and feedback pressure information 508. Step 506 determines if the desired pressure is greater than the sum of the system back pressure and an upward tolerance, and if the feedback pressure is less than the sum of the system back pressure and the upward tolerance. If these two conditions are not met, the process 500 returns to step 504 so that the device mode remains as mode 1. If the conditions are met, then the process 500 proceeds to step 510, indicating that the device mode is now mode 2 (full clutch engagement). From step 510, the process 500 makes two decisions at steps 512 and 514.

At step 512, the process 500 determines if both the desired and feedback pressures are less than the sum of the system back pressure and a downward tolerance. If these conditions are met, the process 500 returns to step 504 such that the device mode returns to mode 1. If the conditions are not met, the process 500 remains in mode 2.

In step 514, the process 500 determines if the desired and feedback pressures are greater than the sum of the maximum desired pressure and the upward tolerance. If these conditions are not true, the process returns to step 510 such that the device mode remains as mode 2. If the conditions are true, the process proceeds to step 516 where the device mode is set to mode 3 (i.e. partial engagement). From step 516, the process 500 makes two additional decisions at steps 518 and 520.

In step 518, the process 500 decides whether both the desired and feedback pressures are less than the sum of the maximum desired pressure and the downward tolerance. If this is the case, the process 500 returns to step 510, indicating the device mode is reset to mode 2. If the conditions are not true, the device mode remains as mode 3.

In step 520, the process 500 determines if both the desired and feedback pressures are less than the sum of the system back pressure and the downward tolerance. If these conditions are not met, the device mode remains as mode 3. If the conditions are true, the process 500 returns to step 504, where the device mode is reset to mode 1.

Figure 13:
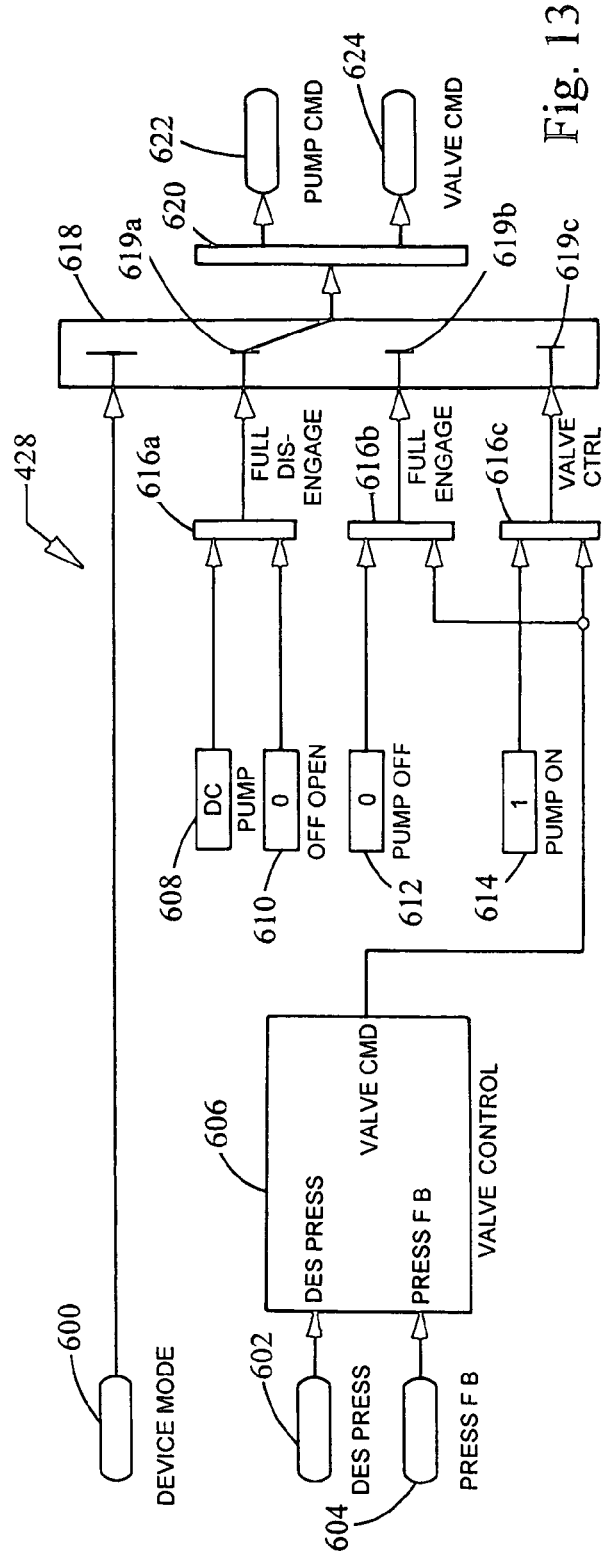
FIG. 13 illustrates the operation of the controller in various device modes.

FIG. 13 illustrates the operation of the hydraulic system control block 428 in the various device modes. The device mode command 600 instructs a multiport switch 618 that switches to one of the device modes 619a (mode 1), 619b (mode 2), or 619c (mode 3). In device mode 1, the pump 28 is operated at certain optimum duty cycle 608 while the valve 38 is set at its default position (zero) 610. The duty cycle can be between 0% to 100%, but is typically about 50%. This mode ensures fastest initial pressure response for the controller. In device mode 2, the pump 28 is set at zero 612 while the valve 38 control is maintained through a valve controller 606 which receives the desired and feedback pressure commands 602 and 604. In device mode 3, the pump 28 is set at full duty-cycle 614 while the valve 38 is controlled to track the desired pressure.

In each of the modes, the pump and valve commands are combined in a respective multiplexer 616a, 616b, or 616c. The combined signals are in turn transmitted to the multiport switch 618. The combined signal from the switch locations 619a, 619b, or 619c is transmitted to a demultiplexer 620 which splits the signals into a pump command 622 and a valve command 624. These signals are then combined in the multiplexer 429 into the single signal transmitted to the thermal compensation block 430.

Figure 14:
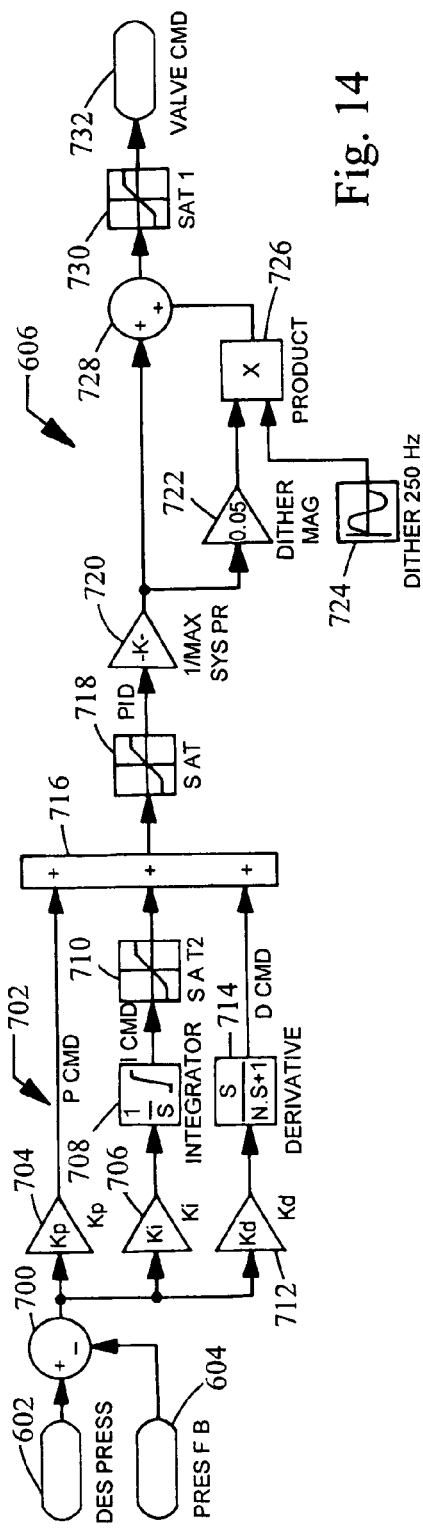
FIG. 14 is a block diagram of a valve control.

FIG. 14 illustrates the operation of the valve control block 606 of FIG. 13. Initially, the feedback pressure 604 is subtracted from the desired pressure command 602 in the subtraction block 700. The difference is then fed to a PID controller 702, where the proportional 704, integral 706, and derivative 712 gains are tuned for optimal response time for the system 400. An integrator anti-windup strategy 708 is built into the integrator block by putting a limit to the integration value, and a saturation limiter 710 sets an upper limit to the integrator output. The derivative control includes a filter 714 to minimize oscillations in the derivative output, in addition to differentiating the error.

The outputs of the proportional, integrator, and derivative blocks are added in a summation block 716, which transmits the combined signal to another saturation limiter 718 to ensure that the signal does not exceed an upper threshold. A converter 720 divides the PID signal from the limiter 718 by the maximum system pressure. A ditherer 726 takes 5% of the signal value 722 from the converter and multiplies it with a sinewave with a frequency of, for example, about 250 Hz 724. This product is added in a summation block 728 with the original output value from the converter 720 to minimize stiction and improve valve performance (such as response, hysteresis, etc.). The summed value is subjected to another limiter 730 that ensures the value does not exceed an upper threshold. The limited value is then provided as a valve command 732 to the multiplexers 616b and 616c (FIG. 13).

Figure 15:
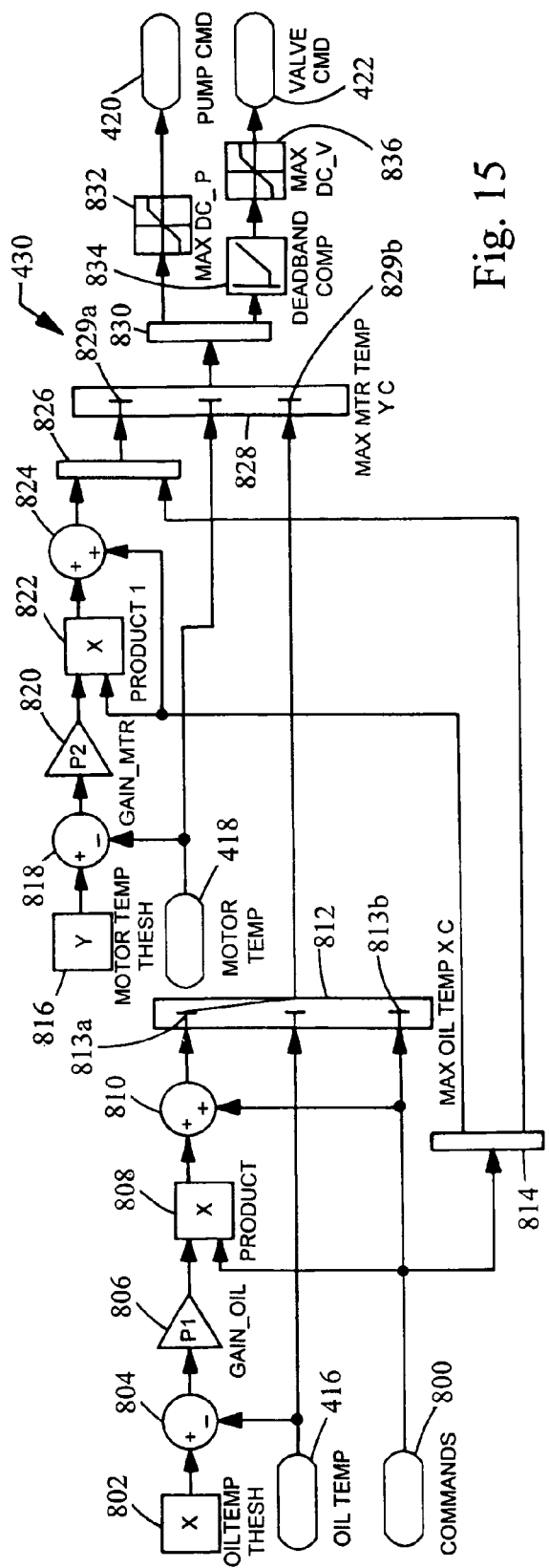
FIG. 15 illustrates a thermal compensation strategy.

FIG. 15 illustrates the operation of the thermal compensation block 430. In brief, when the limiting value of the fluid temperature is exceeded, the algorithm ramps down both the motor and the valve solenoid commands. If the motor temperature exceeds the threshold, only the motor command is ramped down.

As mentioned above, the pump and valve commands from the hydraulic system control block 428 are combined in a multiplexer 429. This combined signal is provided as a command signal 800 to the thermal compensation block 430. The fluid temperature input command 416 is subtracted from an fluid temperature threshold 802 in a subtraction block 804. The difference is provided to a gain block 806, and the signal from the gain block 806 is multiplied by the command signal 800. The product is further added to the command signal 800 in a summation block 810. If the fluid temperature input 416 exceeds the threshold value in 802, a switch 812 switches to the command modified by the fluid temperature 813a. Otherwise, switch 812 passes the original command 813b.

The motor temperature input command 418 is subtracted from an motor temperature threshold 816 in a subtraction block 818. The difference is provided to a gain block 820, and the signal from the gain block 820 is multiplied by the motor command in signal 800 provided by a multiplexer 814 in a block 822. The product is further added to the command signal 800 in a summation block 824. The signal from the summation block 824 is combined with the valve command signal 800 in a multiplexer 826. If the motor temperature input 418 exceeds the threshold value in 816, the switch 828 switches to the command modified by the motor temperature, as indicated by the switch setting 829a. Otherwise switch 828 passes the output from the switch 812 (i.e., the original command, or the command modified by the fluid temperature), as indicated by the switch setting 829b. The output from the switch 828 is fed to a demultiplexer 830. From the demultiplexer 830, part of the signal is fed to a saturation limiter 832 that ensures the pump command signal 420 does not exceed an upper threshold. The demultiplexer 830 also supplies a signal that is subjected to a deadband compensation strategy 834 to compensate for any deadbands in the valve operation. The compensated signal is then supplied to another saturation limiter 836 that prevents the valve command 422 from exceeding an upper threshold limit.

The performance of torque transfer devices, such as the hydraulic coupling systems described above, may vary in production due to a number of factors including manufacturing tolerances. This device variation may be large enough to require matching individual torque transfer devices with ECUs calibrated for specific performance ranges. Alternatively, data from device sensors, such as pressure, temperature, and electrical current level, can aid the algorithm in determining the device performance range. Based on the system performance, control strategy algorithms can be adjusted.

Consequently, a universal ECU 24 can be stocked at service centers.

At device startup, the vehicle status, received by the ECU via the external network, may provide certain input parameters for the algorithm. For example, vehicle status information may answer questions such as:
i. Is the engine rpm>calibrated level?
ii. Is the vehicle brake applied?
iii. Is the transmission in park or neutral?
iv. Are the wheel speeds=0?

The driver module of the ECU 24 briefly applies a minimum amount of current to coupler actuator devices 12, 38 based upon stored values and the present temperature of the fluid. The stored value is either factory set or stored from a previous vehicle drive cycle. In order to normalize data, the temperature, as read from the coupler's temperature sensor, is compared to the temperature stored from a previous algorithm run. An electrical current sensor is monitored to verify that the appropriate current level is being applied. Existing driveline sensors, such as pressure or torque sensors, can be used to monitor the performance of the torque transfer device.

Brief, medium and heavy applications can also be monitored so that a performance curve can be estimated. An appropriate performance look-up table can then used for that drive cycle.

During the life of the torque transfer device, the system may begin to show a change in performance due to the wear of the components, such as the clutch plates. Therefore, the algorithm may also be used to monitor the performance of the coupler 12 for diagnostic purposes. Based upon the difference between the actual and expected performances, control strategies can be adjusted. Moreover, with this algorithm, vehicle performance inconsistencies can be minimized. The algorithm monitors when the performance compensation reaches a preset limit. This limit would indicate excessive wear and an action to compensate for this wear can be executed. Thus, the algorithm can monitor wear over many drive cycles, aid in fine-tuning the system, and limit damage due to worn components. Compensation limits may be calibrated to reflect the mechanical limits of the torque transfer device.

Typically, conventional friction clutches are made in high volume. The time necessary to cure these conventional friction materials may be acceptable, but not necessarily adequate for immediate in-vehicle usage and to withstand overall 150,000+ high mileage durability requirements. Inadequate cure and initial abusive vehicle break-in can result in noises and vibrations generally identified as clutch shudder and/or squawk, as well as friction face fluid glazing and eventual flaking to bare metal.

Figure 16:
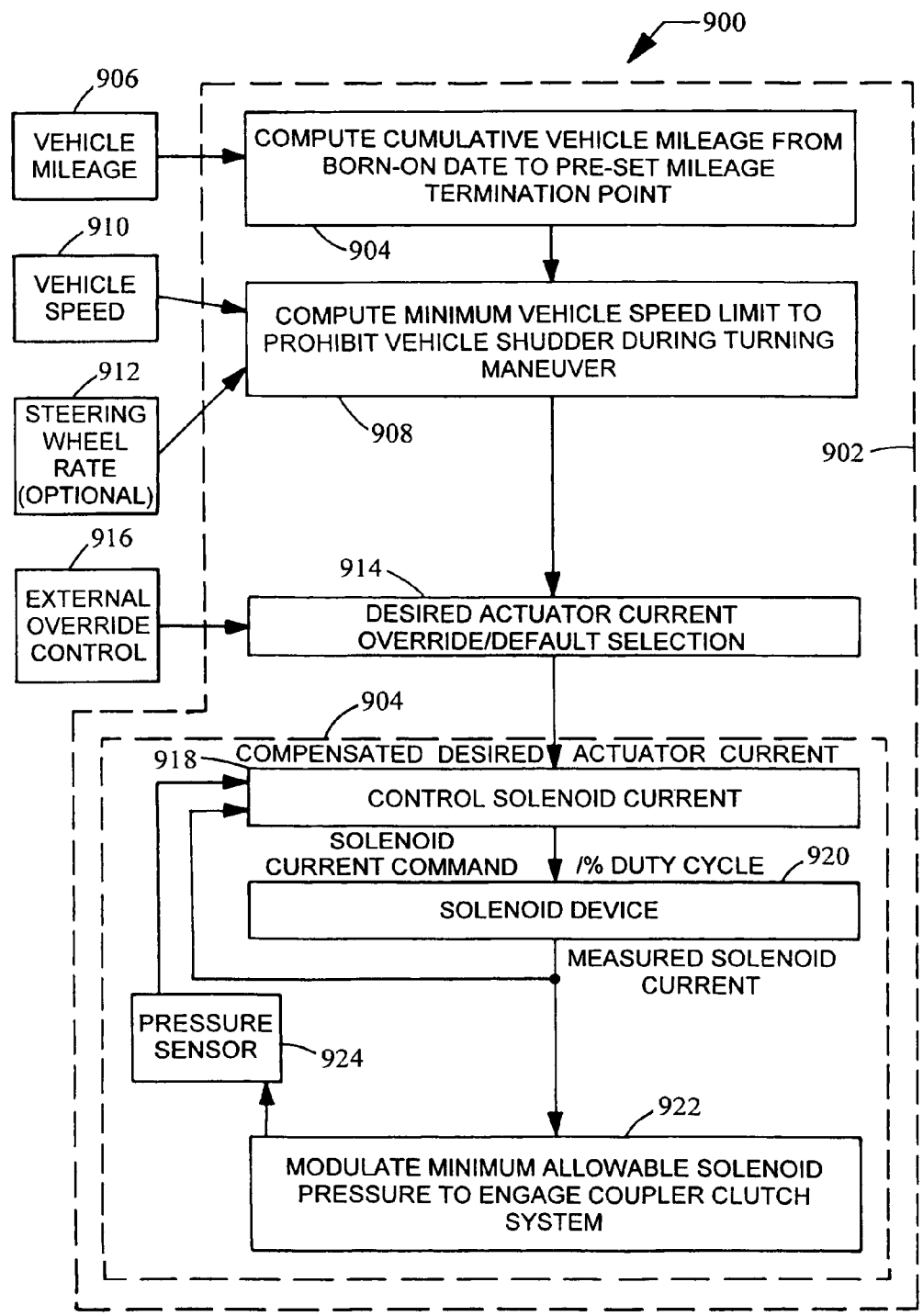
FIG. 16 is a flow diagram of a break-in process for a hydraulic coupler in accordance with the invention.

To overcome such break-in issues, any of the foregoing hydraulic systems discussed above can be provided with a break-in algorithm, such as the process 900 illustrated in FIG. 16, to slow cure the friction surfaces during a limited number of initial vehicle miles with a low pressure clutch modulation strategy.

The algorithm 900 includes an outer loop 902 provided with vehicle mileage from a mileage counter 906, vehicle speed 910, and steering wheel rate 912. The outer loop 902 computes in step 904 the cumulative vehicle mileage from born-on date to pre-set mileage termination point based on the vehicle mileage. The outer loop also computes in step 908, based on the vehicle speed 910 and steering wheel rate 912, the minimum vehicle speed limit to prevent vehicle shudder during turning maneuvers. Next in step 914, the outer loop 902 determines the default selection for the compensated desired actuator current in a control solenoid current step 918 in an inner loop 904. Alternatively, an external override control 916 can provide a desired actuator current override for the control solenoid current step 918. A solenoid current command, based on the desired duty cycle, is supplied to the solenoid device in step 920. The solenoid current is also measured which is fed back to step 918 to compensate the desired actuator current. The measured solenoid current is also fed to step 922 which modulates the minimum allowable solenoid pressure to engage the coupler clutch system. The modulated signals from step 922 are also supplied to the pressure sensor (identified by block 924), which supplies in turn a feedback signal to the compensation step 918. Based on measured temperature, pressure and speed difference across the clutch and separator plate, a look-up table may be utilized to yield desired or available torque output.

In one implementation, the algorithm 900 is provided with a subroutine that includes a mileage counter of say 0 to 3000 miles, a minimum vehicle operation speed (e.g. operation speed>5 MPH), a minimum clutch engaging pressure (e.g., 5 to 10 psi), and an override feature to allow full clutch lock-up to maximum pressure for normal traction control function. When the above conditions are met the clutch is continuously modulated in the on-mode to break in the interacting friction material surfaces of the clutch via a slow cure method to insure appropriate aesthetic and durable functionality for the anticipated lifetime of the vehicle.

The hydraulic systems can be provided with a lubrication warm-up algorithm which operates the system at key-on until the lubricant fluid reaches a threshold temperature. The temperature reading can be the sump temperature or from a sensor that senses the vehicle ambient temperature. The system may be provided with control software that is able to estimate the lubricant sump temperature based on the coupler 12 operating conditions. The system may also include a component-level control algorithm and vehicle level control interface.

Figure 17:
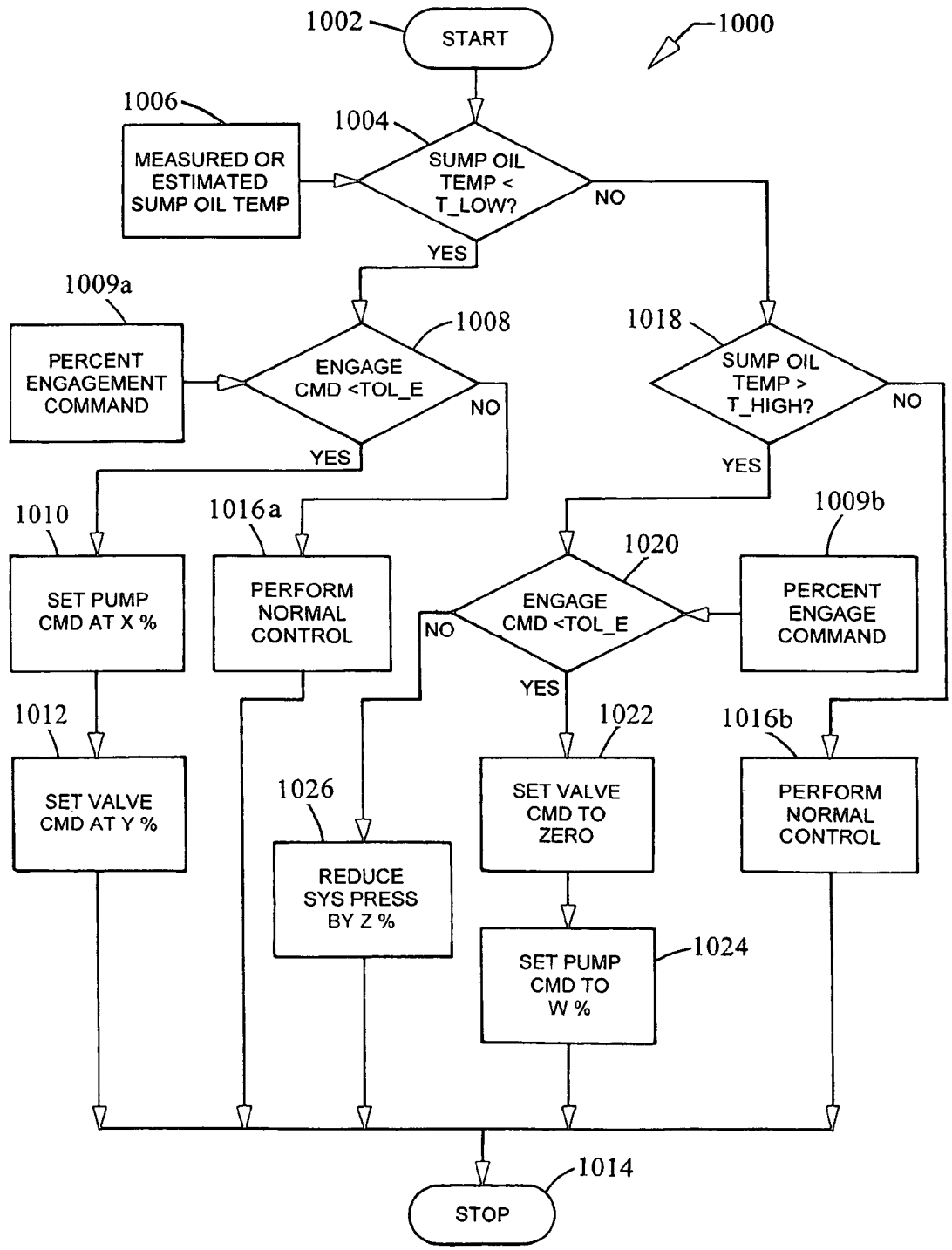
FIG. 17 is a flow diagram of a sequence of steps for lubricant temperature control in accordance with the invention.

An implementation of a lubricant warm-up process 1000 is illustrated in FIG. 17. The process 1000 maintains the hydraulic fluid temperature within the desired operating range so that the hydraulic pressure and consequent torque performance remains predictable and consistent.

After an initiating in step 1002, the process 1000 proceeds to a decision step 1004 which receives measured or estimated sump fluid temperature from a block 1006. The decision step 1004 determines if the sump fluid temperature is less than a lower threshold temperature (T_low). If this condition is true, the process 1000 proceeds to the decision step 1008 that determines if the engagement command (Engage Cmd), as supplied as a percent engagement command from a block 1009a, is less than a desired tolerance (Tol_e). If so, at steps 1010 and 1012, the process 1000 sets the pump and valve commands to desired levels (X %) and (Y %), respectively, and terminates at a step 1014. If the condition in step 1008 is not met, then the process 1000 instructs the system to perform under normal control, as indicated in step 1016a, before terminating in step 1014.

If the step 1004 determines that the sump fluid temperature is not below a lower threshold, then the process 1000 decides in step 1018 if the fluid temperature is above an upper threshold temperature. If not, the process 1000 instructs the system to perform under normal control 1016b, before terminating in step 1014. If the sump fluid temperature exceeds the upper temperature, the process proceeds to a decision step 1020, which receives a percent engagement command from the block 1009b. If the engagement command is less than the specified tolerance (Tol_e), then the process 1000 sets the valve command to zero and the pump command to desired level (W %) in steps 1022 and 1024, respectively, and then terminates at step 1014. If the engagement command is not less than Tol_e, then the process 1000 reduces the system pressure by Z %, as indicated by step 1026, before terminating at step 1014.

It is therefore intended that the foregoing detailed description be regarded as illustrative rather than limiting, and that it be understood that it is the following claims, including all equivalents, that are intended to define the spirit and scope of this invention.

What is claimed is:

1. A hydraulic coupling system, comprising
   a pump;
   a clutch assembly including an actuator and a multi-disk clutch pack coupled to the actuator, the pump pressuring a fluid in the actuator to engage the clutch pack and pumping the fluid through the clutch pack to cool the clutch pack;
   a pressure control valve communicating wit a reservoir, the actuator and the clutch pack for maintaining the fluid pumped to the actuator at a higher pressure than the pressure of the fluid pumped through the clutch pack to cool the clutch;
   a two-way valve which provides a preload pressure to the system when the pump is not operating and the clutch pack is disengaged; and
   a controller which transmits pulse-width modulated control signals to the pump to control the operation of the pump and pulse-width modulated control signals to the valve to control the operation of the valve.

2. The system of claim 1 wherein the two-way valve is a pilot valve which provides a preload pressure to the system when the pump is not operating and the clutch pack is disengaged.

3. The system of claim 1 further comprising an accumulator for compensating for fluid leakage in the system.

4. The system of claim 1 wherein the pump is a gerotor, vane or gear pump.

* * * * *